(12) United States Patent
Brown et al.

(10) Patent No.: US 8,590,151 B2
(45) Date of Patent: Nov. 26, 2013

(54) SYSTEM FOR SUPPORTING AND SERVICING A GAS TURBINE ENGINE

(75) Inventors: Ian Trevor Brown, Tauranga (NZ); Daniel James Doll, Poway, CA (US); Jason Michael Robertson, San Diego, CA (US); Danny Ferrel Smith, San Diego, CA (US)

(73) Assignee: Solar Turbines Inc., San Diego, CA (US)

( * ) Notice: Subject to any disclaimer, the term of this patent is extended or adjusted under 35 U.S.C. 154(b) by 906 days.

(21) Appl. No.: 12/654,374

(22) Filed: Dec. 17, 2009

(65) Prior Publication Data

US 2010/0218508 A1    Sep. 2, 2010

Related U.S. Application Data

(63) Continuation-in-part of application No. 12/003,665, filed on Dec. 28, 2007, which is a continuation-in-part of application No. 11/477,373, filed on Jun. 30, 2006, now Pat. No. 7,976,266.

(60) Provisional application No. 61/193,787, filed on Dec. 23, 2008.

(51) Int. Cl.
    *F01D 25/28* (2006.01)
(52) U.S. Cl.
    USPC ............... 29/889.1; 29/402.03; 29/402.08; 29/464; 29/559; 29/824; 29/281.1; 415/1; 415/122.1; 415/126; 415/213.1; 60/797; 60/798; 269/56; 269/71; 269/73; 248/678; 248/157; 248/424; 248/346.01; 248/544; 184/1.5

(58) Field of Classification Search
    USPC .............. 415/1, 122.1, 126, 213.1, 214.1; 60/796, 797, 798; 29/464, 559, 824, 29/281.1, 889.1, 402.03, 402.08; 269/56, 269/71, 73; 248/544, 672, 678, 424, 248/346.01, 346.03, 346.06, 157; 184/1.5
    See application file for complete search history.

(56) References Cited

U.S. PATENT DOCUMENTS

| | | | |
|---|---|---|---|
| 2,265,940 A | 12/1941 | Forest | |
| 2,930,492 A | 3/1960 | Metcalf | |
| 3,208,217 A * | 9/1965 | Sonder | ............................ 60/798 |
| 3,556,672 A | 1/1971 | Gentile | |

(Continued)

FOREIGN PATENT DOCUMENTS

| | | |
|---|---|---|
| EP | 0246470 A1 | 11/1987 |
| EP | 1300548 A2 | 4/2003 |

(Continued)

OTHER PUBLICATIONS

Notice of Allowance, Mar. 8, 2011, 5 pages, U.S. Appl. No. 11/477,373.

(Continued)

*Primary Examiner* — Christopher Verdier
(74) *Attorney, Agent, or Firm* — Finnegan, Henderson, Farabow, Garrett & Dunner LLP

(57) ABSTRACT

A power system includes a gas turbine engine, which may include a gear box. The gear box may include a pipe connection configured to receive a removable pipe. The power system may also include a moveable support configured to fasten to the pipe connection to at least partially support the gear box.

14 Claims, 36 Drawing Sheets

(56) References Cited

U.S. PATENT DOCUMENTS

| | | |
|---|---|---|
| 3,837,164 A | 9/1974 | Carr |
| 4,044,442 A | 8/1977 | Carlson |
| 4,086,690 A | 5/1978 | Bernasconi |
| 4,451,979 A | 6/1984 | Schuster |
| 4,567,649 A | 2/1986 | Ades et al. |
| 4,570,053 A | 2/1986 | Ades et al. |
| 4,590,653 A | 5/1986 | Ades et al. |
| 4,635,336 A | 1/1987 | Ades et al. |
| 5,318,080 A * | 6/1994 | Viken .................. 184/1.5 |
| 5,383,652 A | 1/1995 | Van Den Berg |
| 5,473,883 A | 12/1995 | Naudet |
| 5,870,824 A | 2/1999 | Lilja et al. |
| 5,921,075 A | 7/1999 | Shimoyama et al. |
| 6,279,309 B1 | 8/2001 | Lawlor et al. |
| 6,415,610 B1 | 7/2002 | Parker |
| 6,792,809 B1 | 9/2004 | Moore |
| 6,837,673 B2 | 1/2005 | Ootoshi et al. |
| 6,871,504 B2 | 3/2005 | Kuroki et al. |
| 7,159,403 B2 | 1/2007 | Kastrup et al. |
| 7,185,498 B1 | 3/2007 | Jonsson |
| 2003/0014961 A1 | 1/2003 | Lawlor |
| 2004/0060302 A1 | 4/2004 | Kuroki et al. |
| 2005/0150095 A1 | 7/2005 | Ashar et al. |
| 2005/0183529 A1 | 8/2005 | Miller |
| 2006/0148612 A1* | 7/2006 | Albers et al. .................. 475/331 |
| 2007/0033795 A1 | 2/2007 | McCaffrey et al. |
| 2007/0084187 A1 | 4/2007 | Moniz et al. |
| 2007/0131839 A1 | 6/2007 | Dunn et al. |
| 2008/0003093 A1 | 1/2008 | Brown et al. |
| 2008/0187431 A1 | 8/2008 | Brown et al. |
| 2010/0095683 A1 | 4/2010 | Glynn |

FOREIGN PATENT DOCUMENTS

| | | |
|---|---|---|
| GB | 2268314 A | 1/1994 |
| JP | 64-077723 A | 3/1989 |
| JP | 03074501 | 3/1991 |
| JP | 08-270406 A | 10/1996 |
| JP | 10-073003 A | 3/1998 |
| JP | 11-011397 A | 1/1999 |
| JP | 2001 271656 A | 10/2001 |
| JP | 2001-317374 A | 11/2001 |
| WO | WO 98/50727 | 11/1998 |
| WO | WO 99-63211 A1 | 12/1999 |
| WO | WO 00/17492 | 3/2000 |

OTHER PUBLICATIONS

Notice of Allowance, Oct. 18, 2010, 4 pages, U.S. Appl. No. 11/477,373.
Reply to Office Action, Jul. 26, 2010, 17 pages, U.S. Appl. No. 11/477,373.
Non-Final Office Action, Jan. 25, 2010, 15 pages, U.S. Appl. No. 11/477,373.
Preliminary Amendment, Jun. 30, 2010, 3 pages, U.S. Appl. No. 12/654,375.
Korean Intellectual Property Office, PCT International Search Report and Written Opinion mailed Aug. 31, 2010 for international application No. PCT/US2009/069213.

* cited by examiner

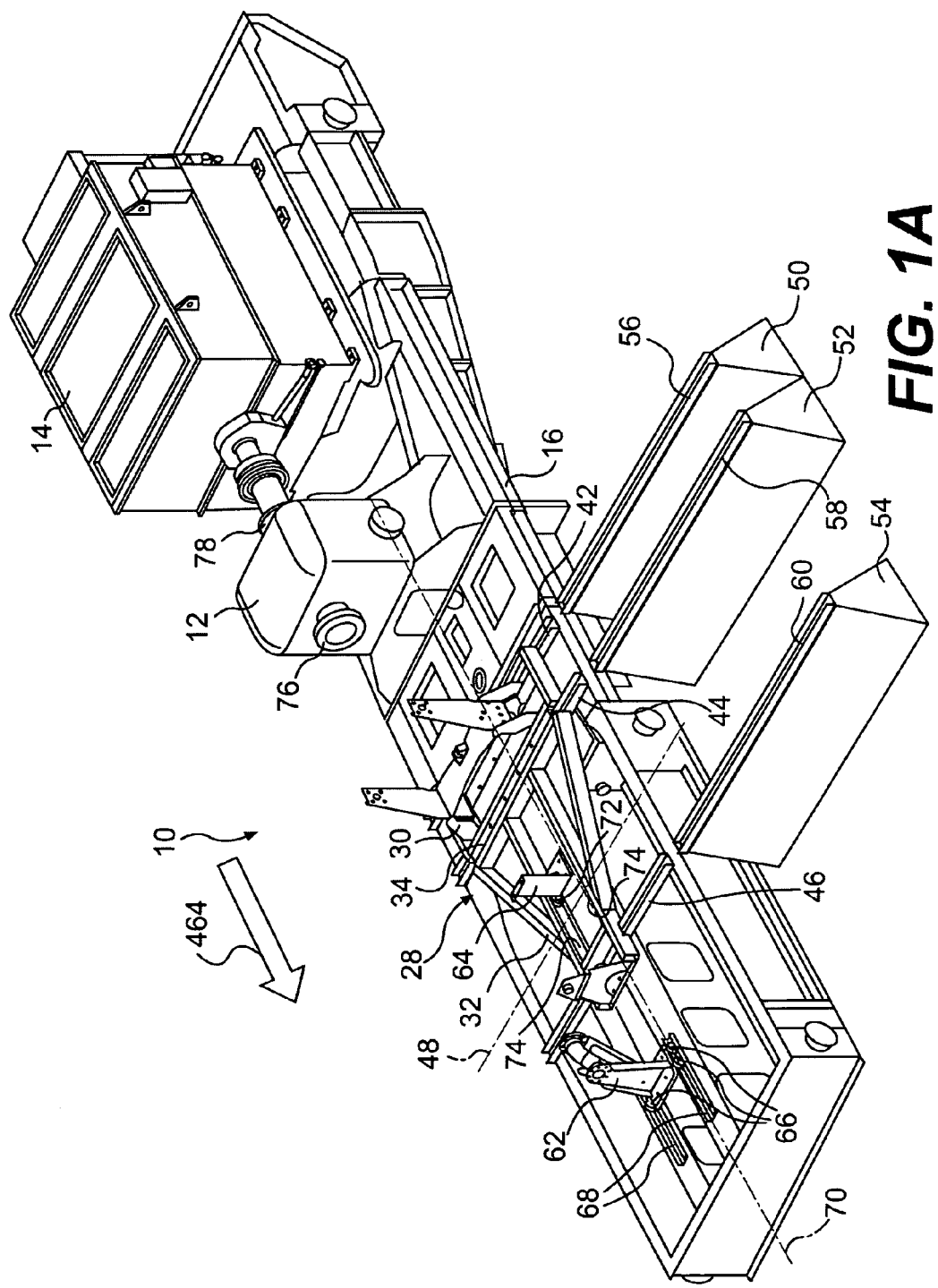

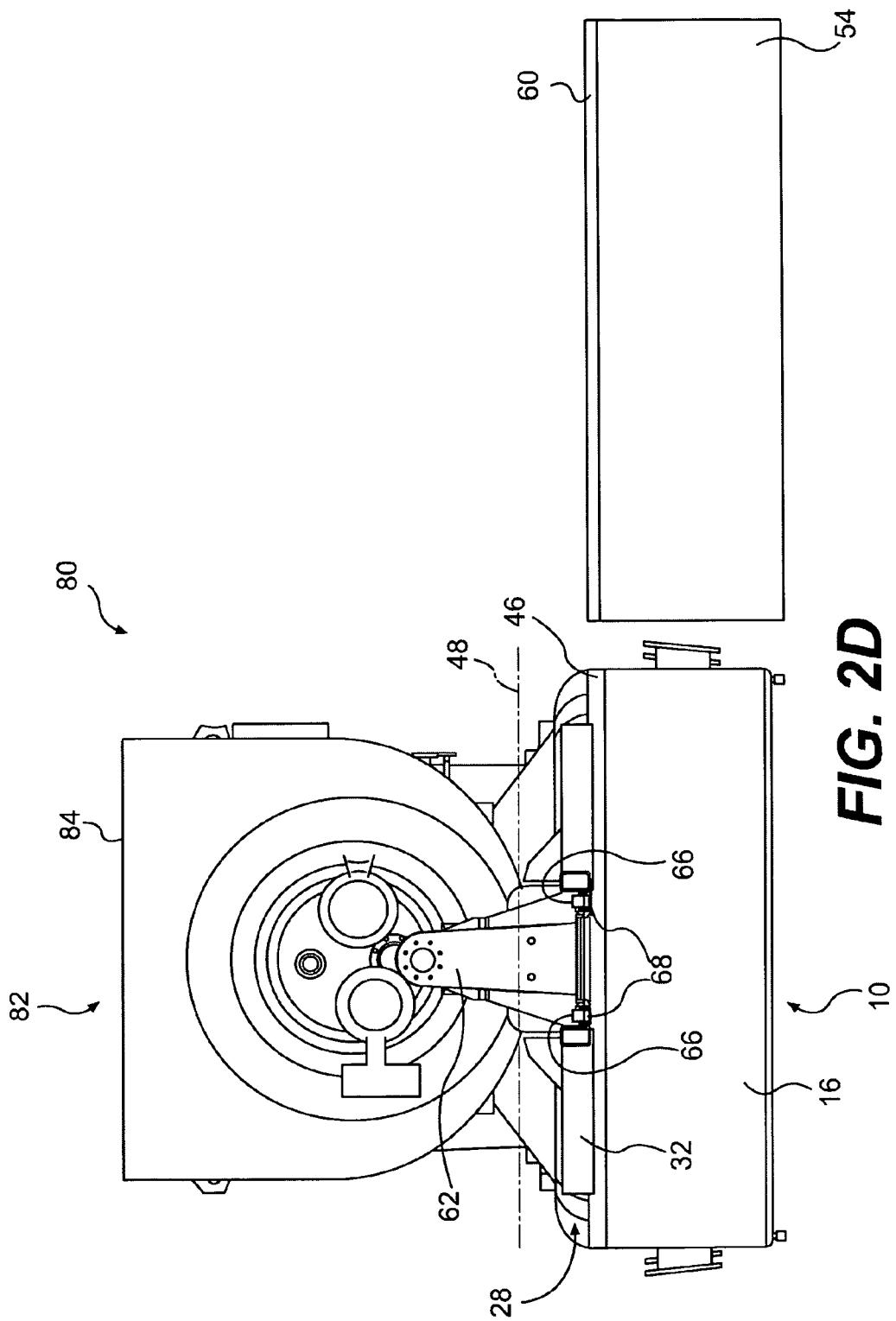

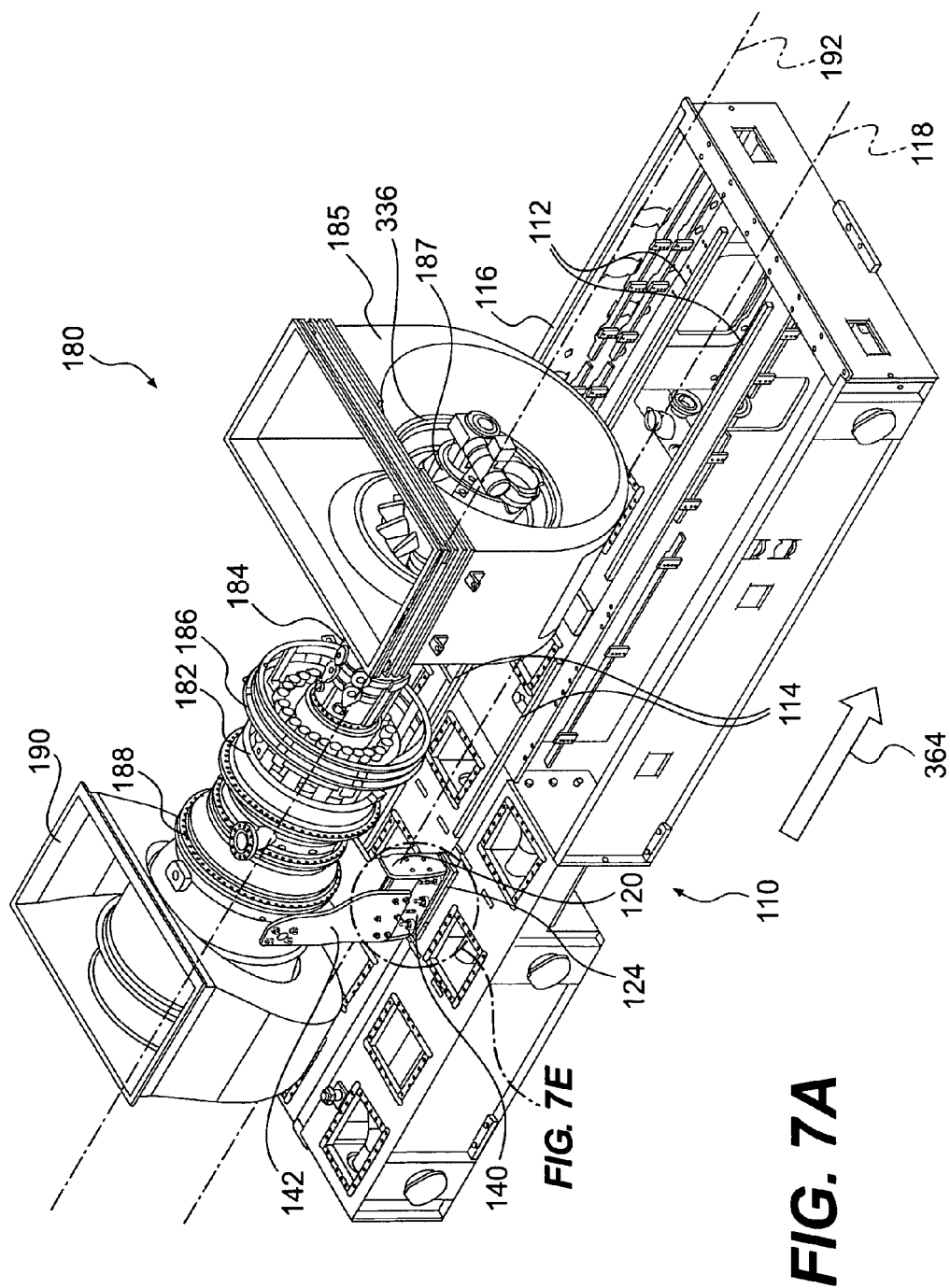

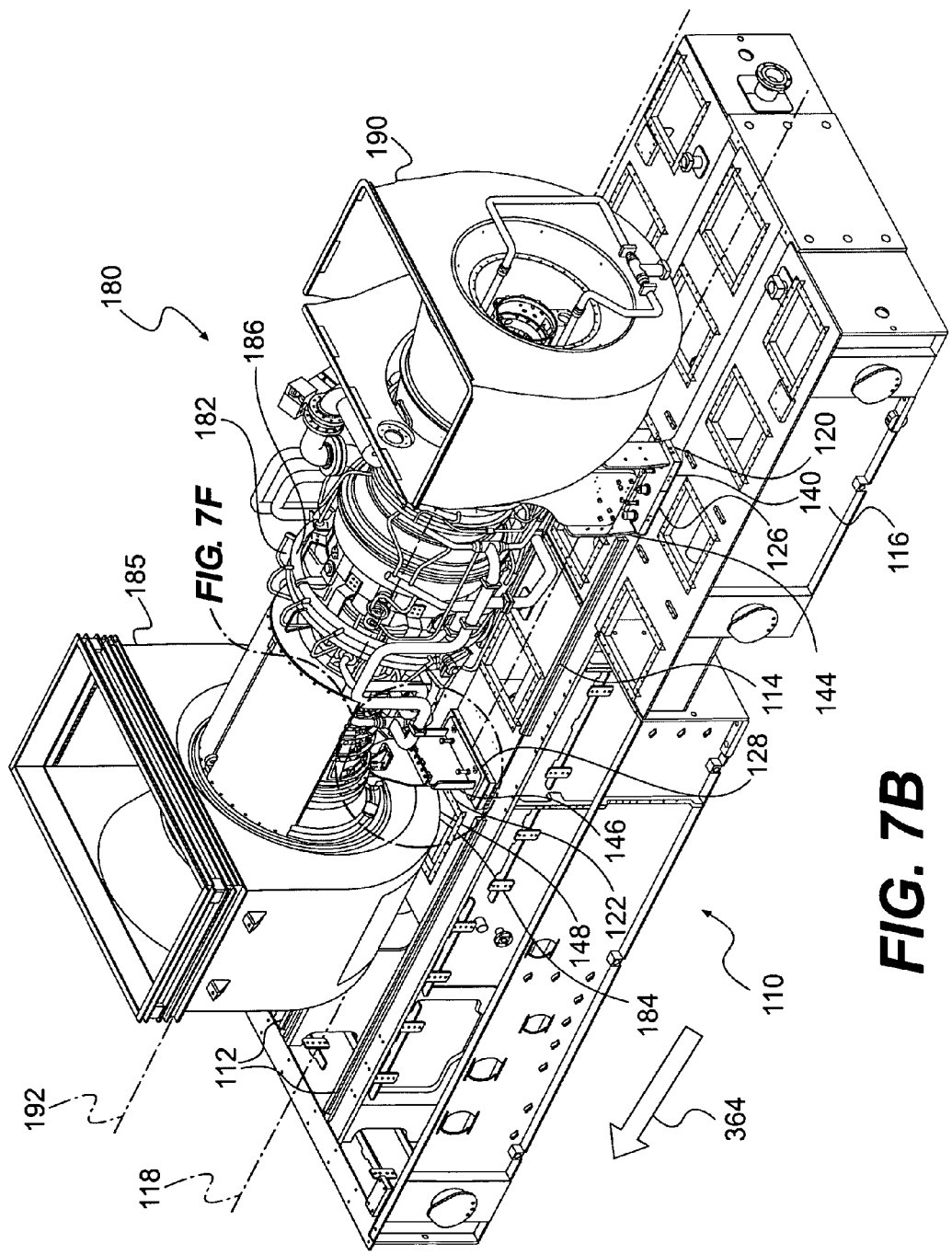

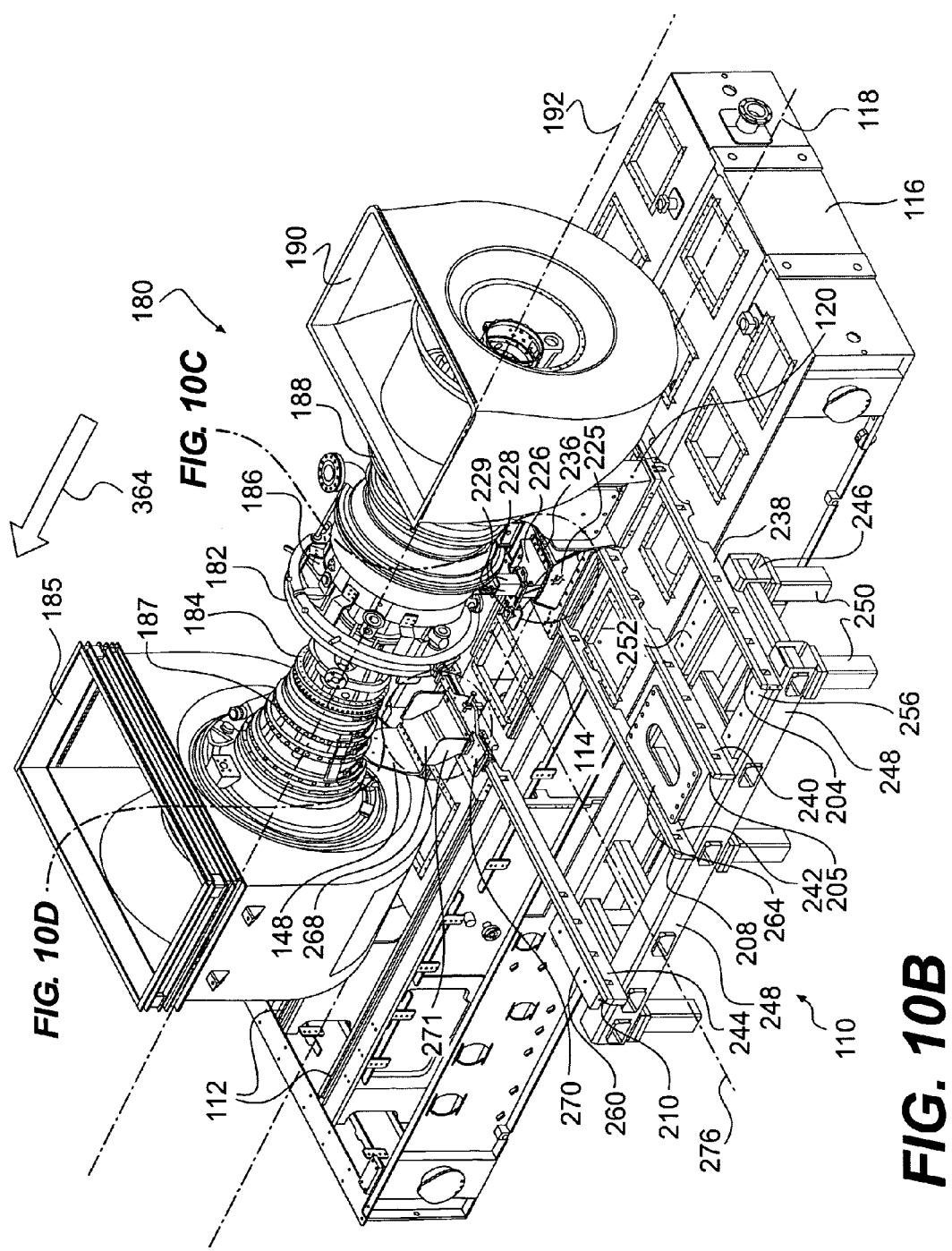

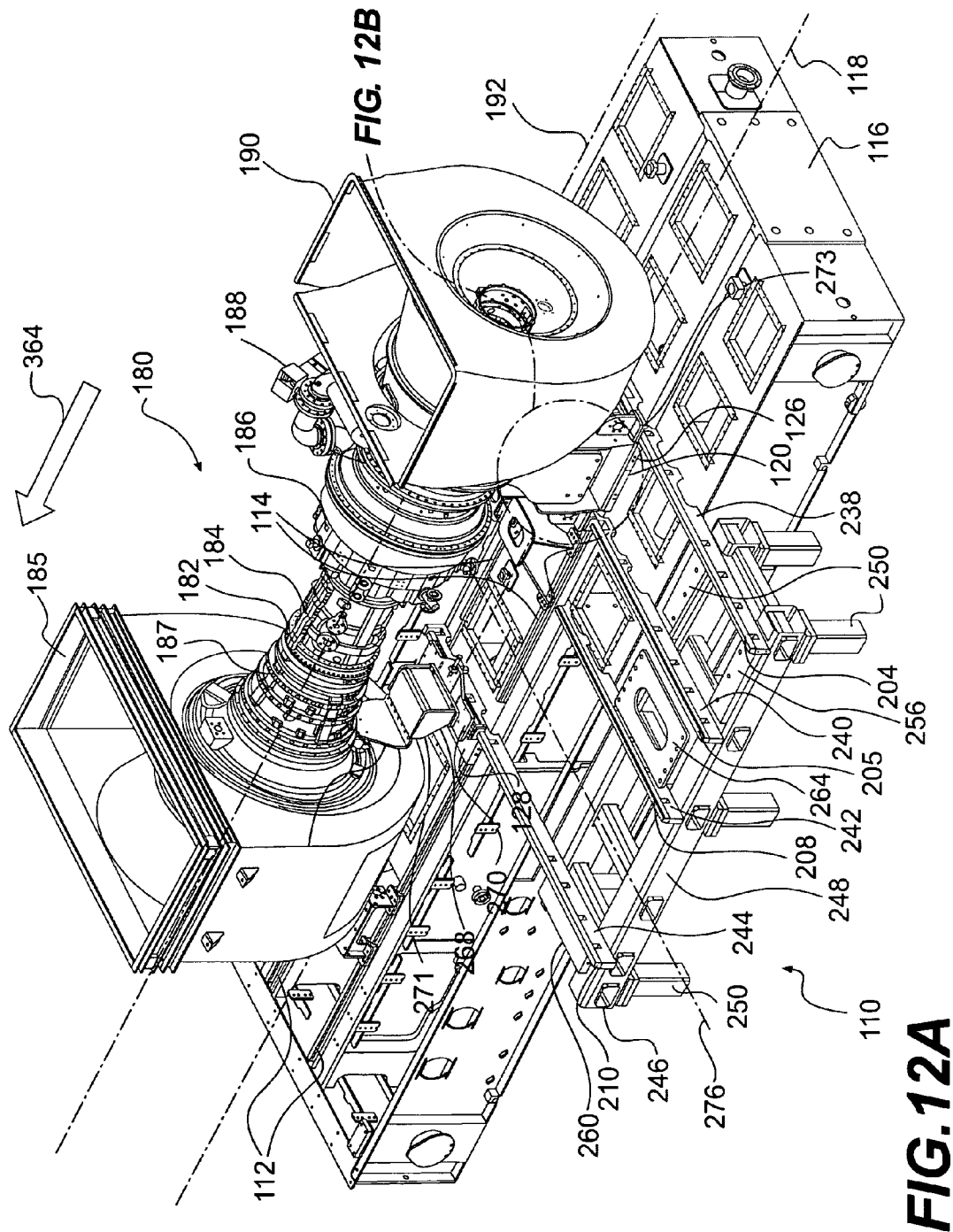

SYSTEM FOR SUPPORTING AND SERVICING A GAS TURBINE ENGINE

This application claims the benefit of priority under 35 U.S.C. §119(e) of U.S. Provisional Application No. 61/193,787, filed Dec. 23, 2008. This application is also a continuation-in-part of U.S. patent application Ser. No. 12/003,665, filed Dec. 28, 2007, of Ian Trevor Brown, Daniel James Doll, and Jason Michael Robertson, and is a continuation-in-part of U.S. patent application Ser. No. 11/477,373, of Ian Trevor Brown and Daniel James Doll, filed Jun. 30, 2006, now U.S. Pat. No. 7,976,266, and entitled "Power System." Provisional Application No. 61/193,787, application Ser. No. 12/003,665, and application Ser. No. 11/477,373 are incorporated herein by reference in their entirety.

TECHNICAL FIELD

The present disclosure relates to gas turbine engine power systems and, more particularly, to systems and methods for servicing such systems.

BACKGROUND

Many power systems include a gas turbine engine and a power load, such as a pump, compressor, or electric generator, drivingly connected to the gas turbine engine. Various configurations of support systems are employed to support the gas turbine engine and the power load of such power systems. In some such power systems, the gas turbine engine and the power load are both attached through fixed mounts to a common, stationary support structure.

Unfortunately, such a support structure may make replacing or repairing the gas turbine engine difficult. Removing the gas turbine engine from the stationary support structure may involve unfastening the gas turbine engine from numerous fixed mounts, which may require considerable time and effort. Additionally, after the gas turbine engine is unfastened from the support structure, removing the gas turbine engine from the support structure may require using lifting equipment and exercising considerable care to avoid colliding the gas turbine engine with other objects.

Additionally, many repair operations may involve separating sections (e.g., intake ducting, compressor, combustor, power turbine, exhaust collector) of the gas turbine engine from one another, which may require removing the gas turbine engine from the support structure. For example, replacing a damaged section of the gas turbine engine may require removing the gas turbine engine from the support structure, separating the damaged section from the other sections, installing a replacement section, and reassembling the sections of the gas turbine engine. When the gas turbine engine is off of its support structure, supporting and maneuvering the heavy, unwieldy sections of the gas turbine engine when separating and reassembling them may be quite difficult. Further, separating and removing internal sections (e.g, a compressor), that are positioned between two other adjacent sections (e.g., the intake ducting and combustor) of the gas turbine engine, without completely separating and removing at least one of the two adjacent sections, may also be difficult.

A system and method of installing a modular gas turbine engine is disclosed in U.S. Pat. No. 4,044,442 issued to Carlson ('442 patent). The '442 patent discloses a large capacity gas-turbine unit including a gas generator unit, a power turbine unit, and a generator. The gas generator unit, power turbine unit, and generator are aligned sequentially along a drive axis. The '442 patent discloses horizontally moving the gas generator unit in a direction substantially parallel to the drive axis to engage the already installed power turbine unit. The gas generator unit is moved horizontally on roller devices and a portion of the weight of the gas generator unit is supported by an overhead traveling crane.

The system and method of the '442 patent may allow for horizontal installation of a section of a gas turbine engine, but fails to permit horizontal movement in a direction substantially parallel to the drive axis of the GTE between two stationary sections of the GTE. The system of the '442 patent is inefficient because sections of the GTE are installed sequentially in a direction along the drive axis, whereas it may be desired to install or remove an interior section of the GTE while adjacent sections on each side the interior section remain installed. Additionally, the system of the '442 may be expensive, for example, due to the cost of labor intensive and time consuming process required to install GTE sections sequentially.

SUMMARY OF THE INVENTION

One disclosed embodiment relates to a power system. The power system may include a gas turbine engine, which may include a gear box. The gear box may include a pipe connection configured to receive a removable pipe. The power system may also include a moveable support configured to fasten to the pipe connection to at least partially support the gear box.

Another disclosed embodiment relates to a method of supporting a gear box of a gas turbine engine. The method may include disconnecting a pipe from a pipe connection on the gear box, fastening a first moveable support to the pipe connection, and moving the gear box while supporting the gear box at least partially by the pipe connection with the first moveable support.

BRIEF DESCRIPTION OF THE DRAWINGS

FIG. 1A is a perspective view of a first embodiment of a support system for a power system according to the present disclosure;

FIG. 2D is an end view of the power system shown in FIG. 2A;

FIG. 7A is a perspective view of a second embodiment of a power system, wherein the power system is in a first state;

FIG. 7B is a perspective view of the structure shown in FIG. 7A from a different angle;

FIG. 10B is a perspective view of the power system shown in FIG. 7A in another state;

FIG. 12A is a perspective view of the power system shown in FIG. 7A in another state;

DETAILED DESCRIPTION

Figure 1B:
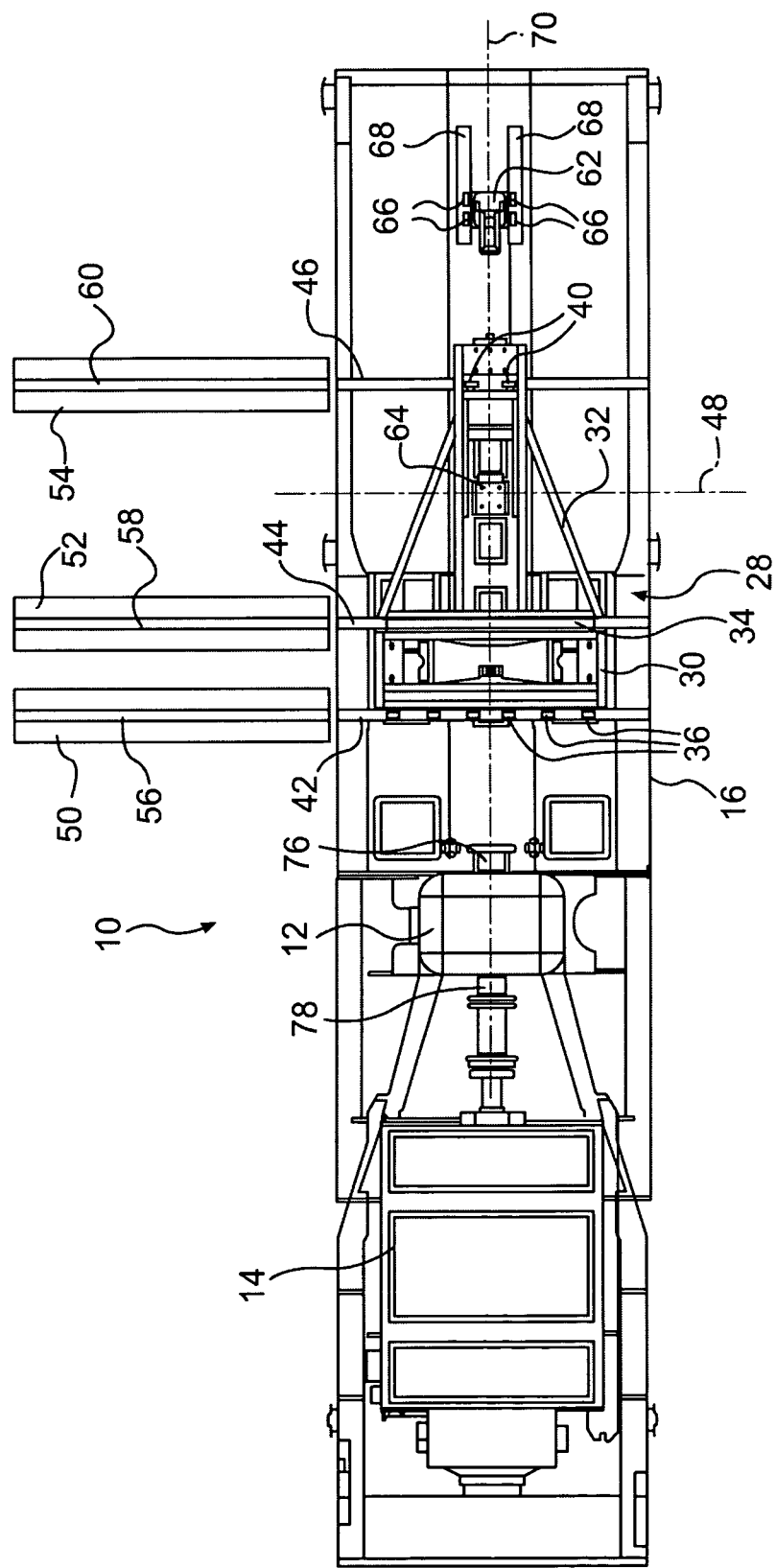
FIG. 1B is a plan view of the support system shown in FIG. 1A.

FIGS. 1A-1D illustrate a first embodiment of a support system 10 for a power system having a gas turbine engine (not shown in FIGS. 1A-1D), support system 10 having a power-transfer unit 12 and a power load 14 mounted thereon. Support system 10 may include a base/support 16 that supports power-transfer unit 12 and power load 14. For example, as FIGS. 1A-1D show, base/support 16 may be a frame. Base/support 16 may be supported by various entities, including, but not limited to, the ground (not shown), one or more structures supported by the ground (not shown), one or more structures of a vehicle (not shown), and/or one or more structures of a marine vessel (not shown).

Support system 10 may include various provisions for supporting a gas turbine engine (not shown). For example, support system 10 may include a frame 28 for supporting a gas turbine engine from base/support 16. Frame 28 may include a support 30 and a support 32 disposed adjacent to one another.

Support 30 and support 32 may include provisions (not shown) for fastening support 30 and support 32 in fixed positions relative to one another. For example, support 30 and support 32 may include corresponding bolt holes (not shown) at an interface 34 between support 30 and support 32 for fixedly fastening support 30 to support 32. When not fastened in fixed positions with respect to one another, supports 30, 32 may be able to move independently of one another.

Figure 1C:
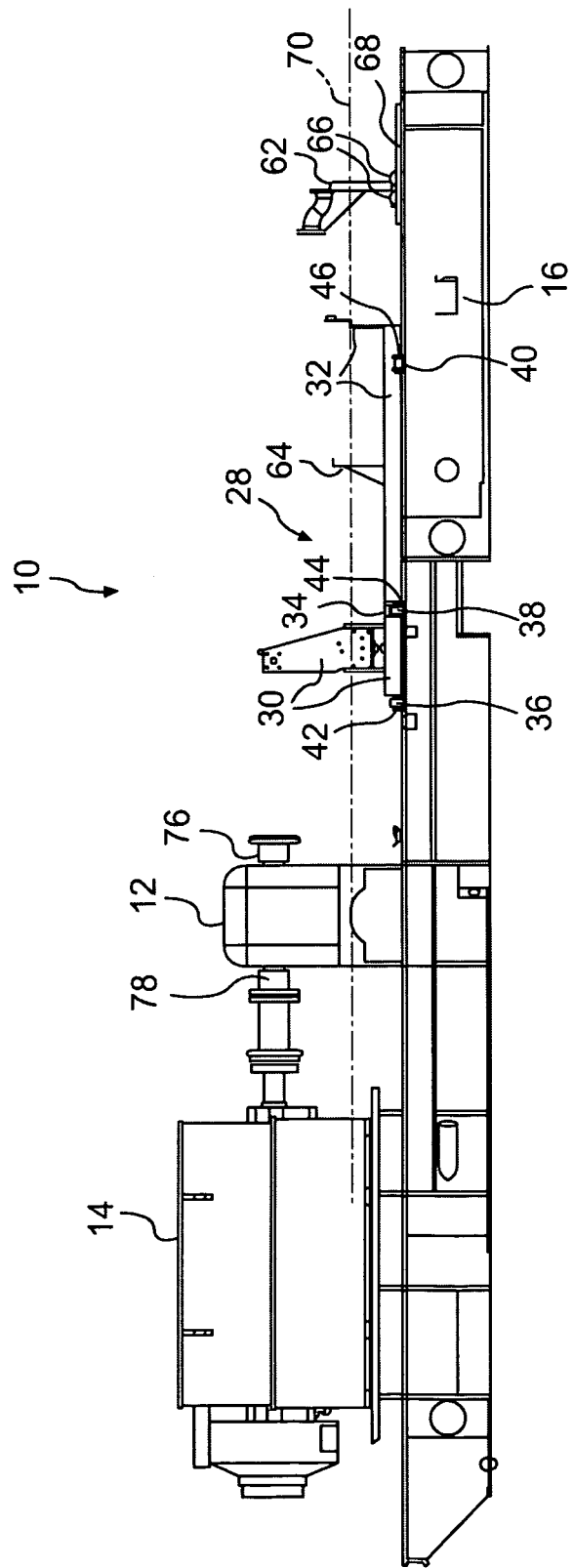
FIG. 1C is a side view of the support system shown in FIG. 1A.
Figure 1D:
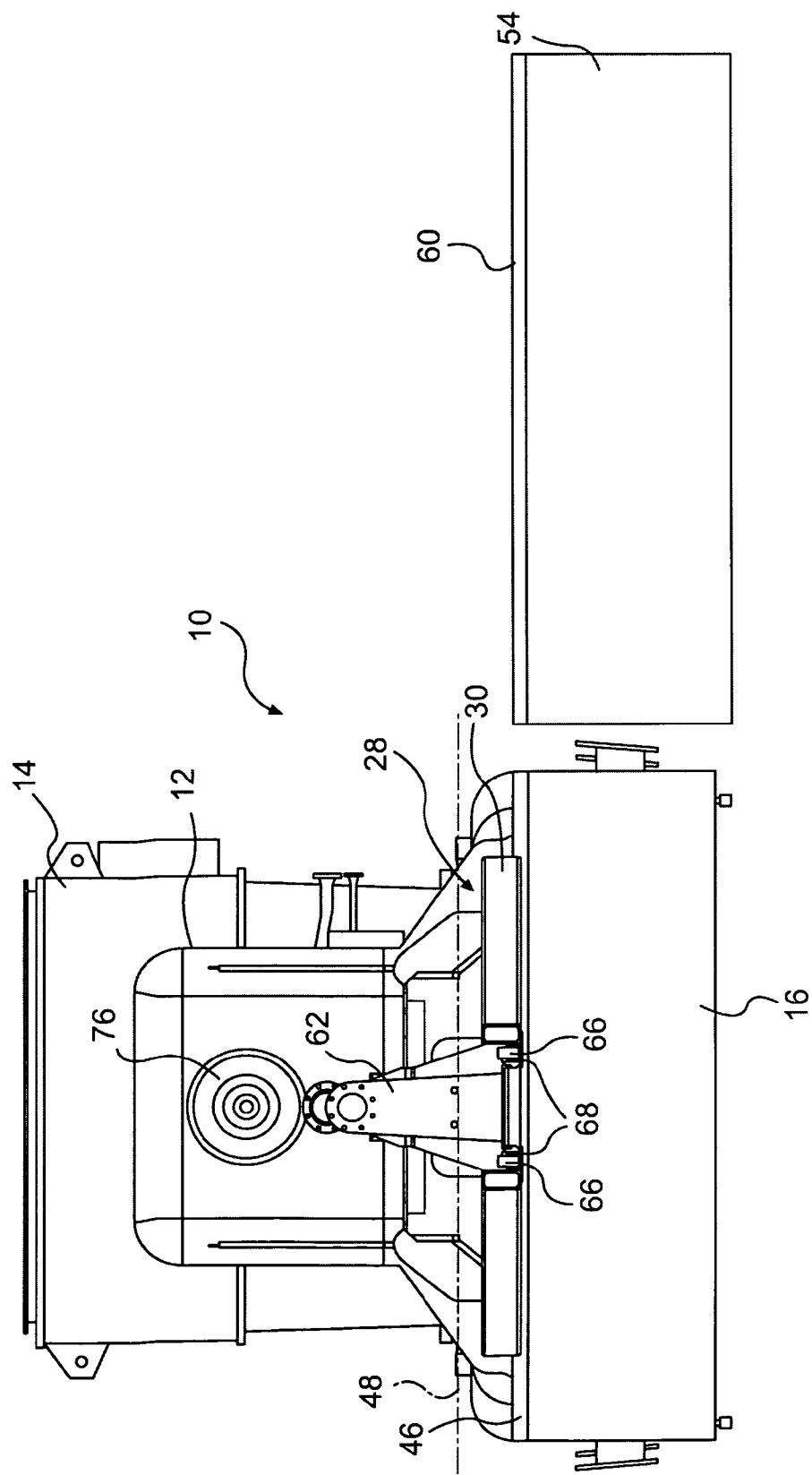
FIG. 1D is an end view of the support system shown in FIG. 1A.

In some embodiments, such as the embodiment shown in FIGS. 1A-1D, supports 30, 32 may be configured to slide with respect to base/support 16. Base/support 16 may include guide tracks 42, 44, 46 extending parallel to an axis 48 (FIGS. 1A, 1B). As is best shown in FIG. 1C, supports 30, 32 may be guided by rollers 36, 38, 40 disposed in guide tracks 42, 44, 46 on base/support 16.

Support system 10 may include various provisions (not shown) for holding supports 30, 32 stationary on base/support 16 when desired. For example, support system 10 may include one or more jacks for raising supports 30, 32 until rollers 36, 38, 40 are separated from guide tracks 42, 44, 46; one or more props for supporting supports 30, 32 in such elevated positions; and fasteners for fixing supports 30, 32 in such elevated positions. Additionally, or alternatively, support system 10 may also include various other provisions (not shown) for selectively securing supports 30, 32 at various positions along axis 48, including, but not limited to, clamps, detents, fasteners, stops, and ratchets.

Support system 10 may also include provisions for supporting support 30 and/or support 32 off of base/support 16. For example, support system 10 may include portable supports 50, 52, 54 configured to hold supports 30, 32. As FIGS. 1A-1D show, portable supports 50, 52, 54 may include guide tracks 56, 58, 60 configured to receive rollers 36, 38, 40 of supports 30, 32.

Support system 10 may also include a moveable support 62 and a moveable support 64. Moveable support 62 may be configured to slide on base/support 16. As FIGS. 1A-1D show, moveable support 62 may be guided by rollers 66 disposed in guide tracks 68 on base/support 16. Guide tracks 68 may extend parallel to an axis 70 (FIGS. 1A-1C), which may be disposed at an angle, such as 90 degrees, to axis 48. Moveable support 64 may be configured to slide on support 32. Moveable support 64 may be guided by rollers 72 disposed in guide tracks 74 on support 32. Like guide tracks 68, guide tracks 74 may extend parallel to axis 70. Support system 10 may also include various provisions (not shown) for selectively securing moveable supports 62, 64 at various positions along axis 70, including, but not limited to, clamps, detents, fasteners, stops, and ratchets.

Support system 10 is not limited to the configuration shown in FIGS. 1A-1D. For example, base/support 16 may be a collection of separate support structures supported by the ground, rather than a frame. Additionally, rather than being parts of a common frame 28, supports 30, 32 may be fully independent of one another. Furthermore, support system 10 may include provisions other than rollers 36, 38, 40 and guide tracks 42, 44, 46 for facilitating movement of supports 30, 32. For example, support system 10 may include other types of slider systems and/or various types of moveable linkages for facilitating movement of supports 30, 32. Furthermore, each of the components of support system 10 may have various shapes other than those shown in FIGS. 1A-1D.

Power-transfer unit 12 may be any type of component configured to receive power from a power source (not shown in FIGS. 1A-1D) and transmit that power to power load 14. Power-transfer unit 12 may include an input shaft 76 for receiving power from a power source, an output shaft 78 connected to power load 14, and various components for transferring power from input shaft 76 to output shaft 78. In some embodiments, power-transfer unit 12 may be a speed-reduction unit configured to rotate output shaft 78 at a slower speed than the power source connected to input shaft 76 rotates input shaft 76.

Power load 14 may be any type of component configured to receive power from power-transfer unit 12 and perform one or more tasks with that power. For example, power load 14 may be an electric generator, a pump, or a compressor.

Figure 2A:
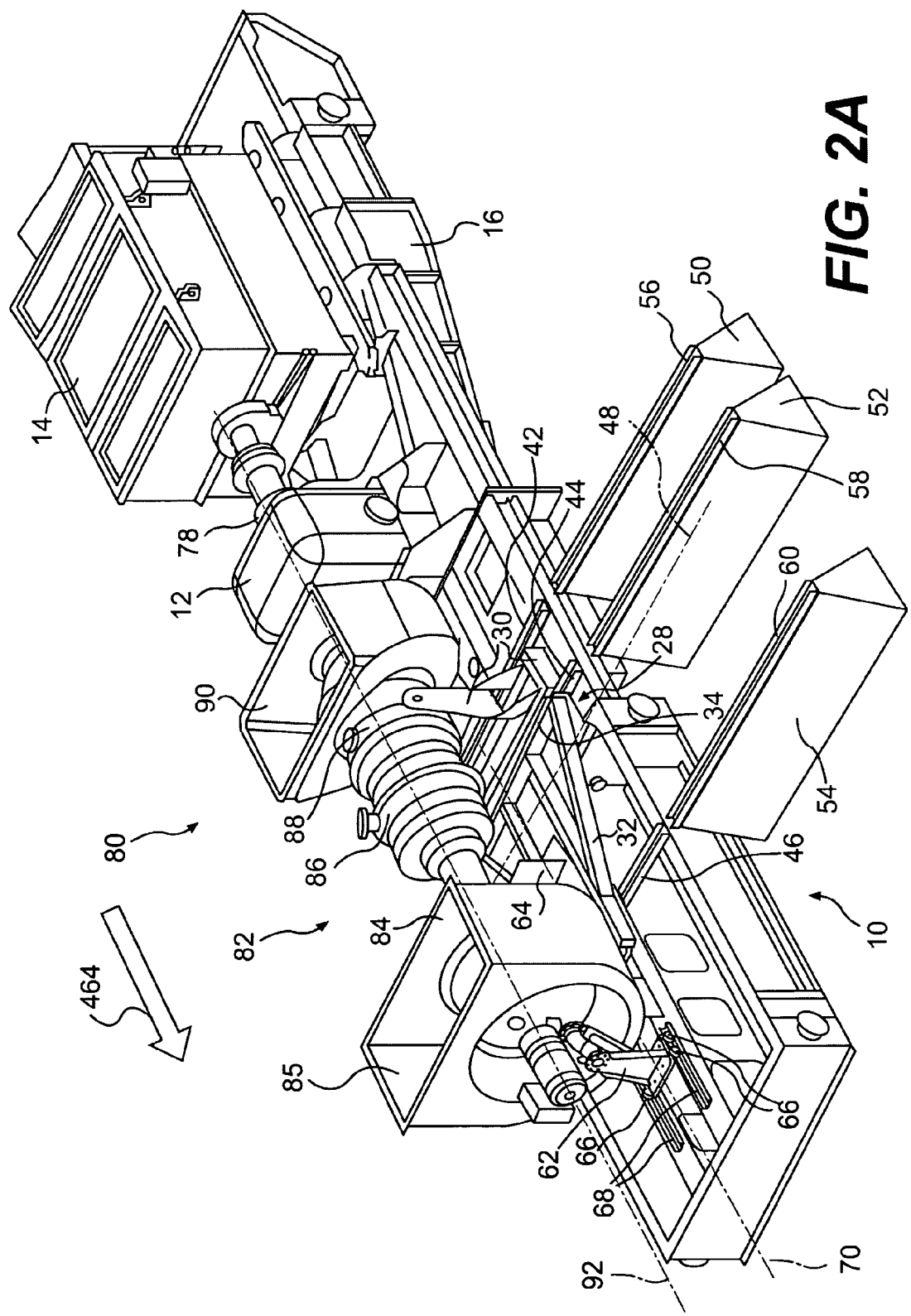
FIG. 2A is a perspective view of a power system that includes the support system shown in FIG. 1A, wherein the power system is in a first state.
Figure 2B:
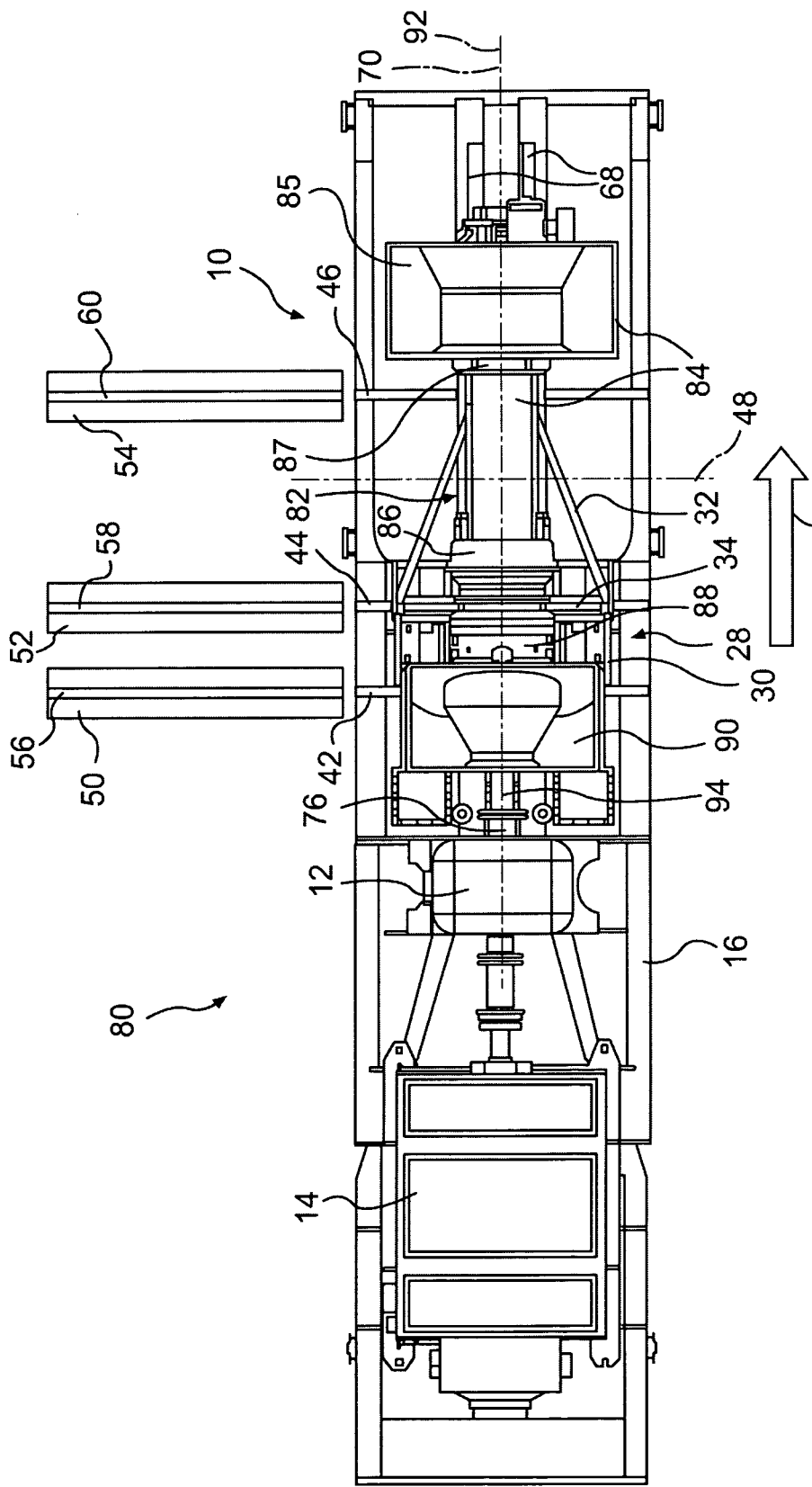
FIG. 2B is a plan view of the power system shown in FIG. 2A.
Figure 2C:
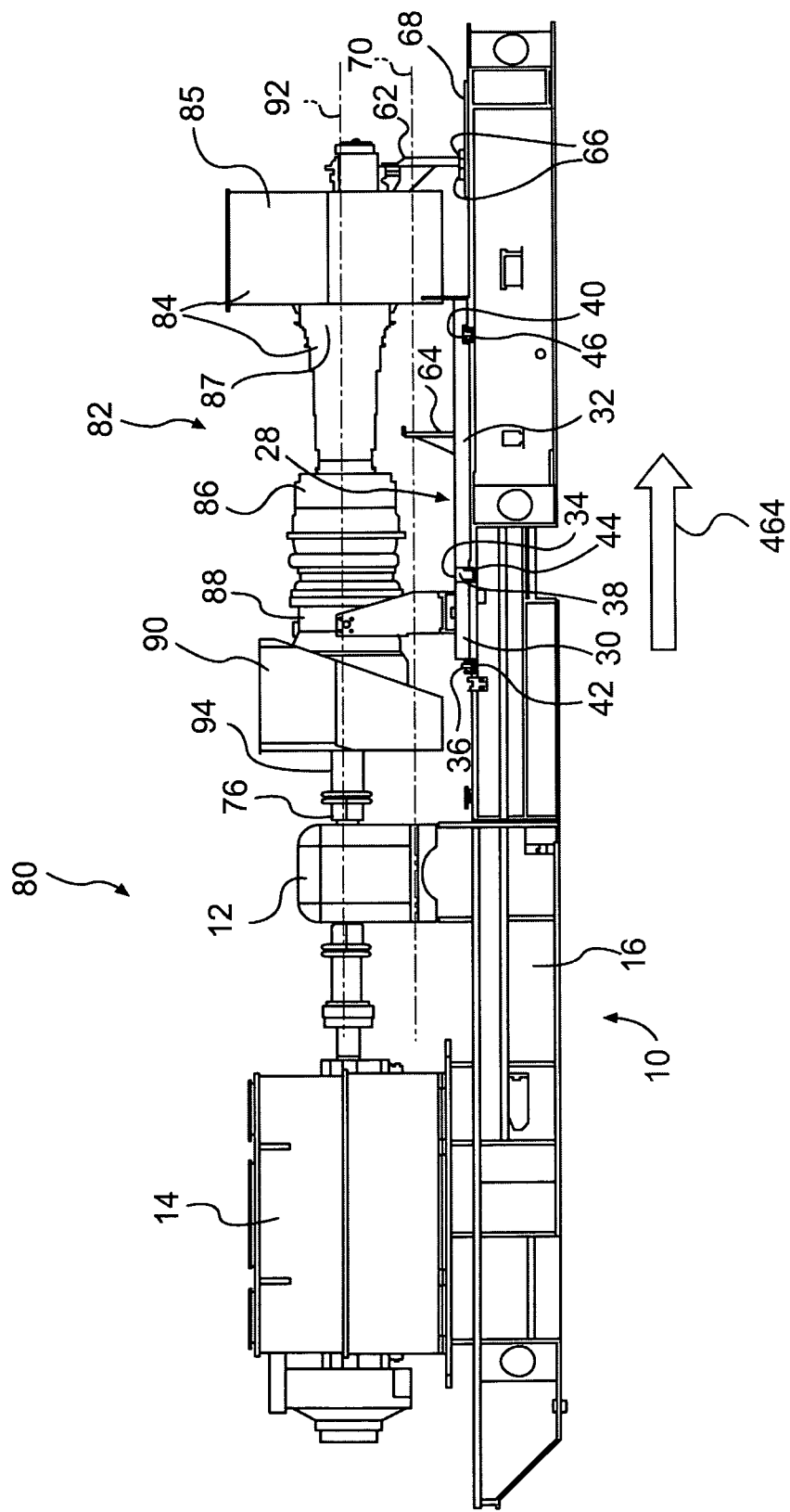
FIG. 2C is a side view of the power system shown in FIG. 2A.

FIGS. 2A-2D show a power system 80 that includes power-transfer unit 12, power load 14, and a gas turbine engine 82 mounted to support system 10. Gas turbine engine 82 may include a gas producer 84, a combustor 86, a power-turbine section 88, and an exhaust collector 90 fixedly connected to one another. Gas producer 84 may include intake ducting 85 and a compressor 87. That is, gas turbine engine 82 may include multiple sections (e.g., intake ducting 85, compressor 87, power turbine section 88, exhaust collector 98) that may be separated from one another. Support 32 may support gas producer 84, and support 30 may support power-turbine section 88. A longitudinal axis 92 of gas turbine engine 82 may extend substantially parallel to axis 70. As is best seen in FIGS. 2B and 2C, gas turbine engine 82 may include an output shaft 94 connected to input shaft 76 of power-transfer unit 12.

Gas turbine engine 82 and each component and section thereof may have a forward end portion and an aft end portion. The forward end of each gas turbine engine 82 and each component and section thereof may be the end furthest in a forward direction 464. For purposes of this disclosure, forward direction 464 is considered to be opposite the direction of compressed air flow inside compressor 87 during operation, which in the embodiment shown in FIGS. 2A-2D, is also the direction from power turbine section 88 toward compressor 87.

Mounting of gas turbine engine 82 to support system 10 is not limited to the example shown in FIGS. 2A-2D. For example, sections of gas turbine engine 82 other than power-turbine section 88 and gas producer 84 may mount to supports 30 and 32, respectively.

Figure 6A:
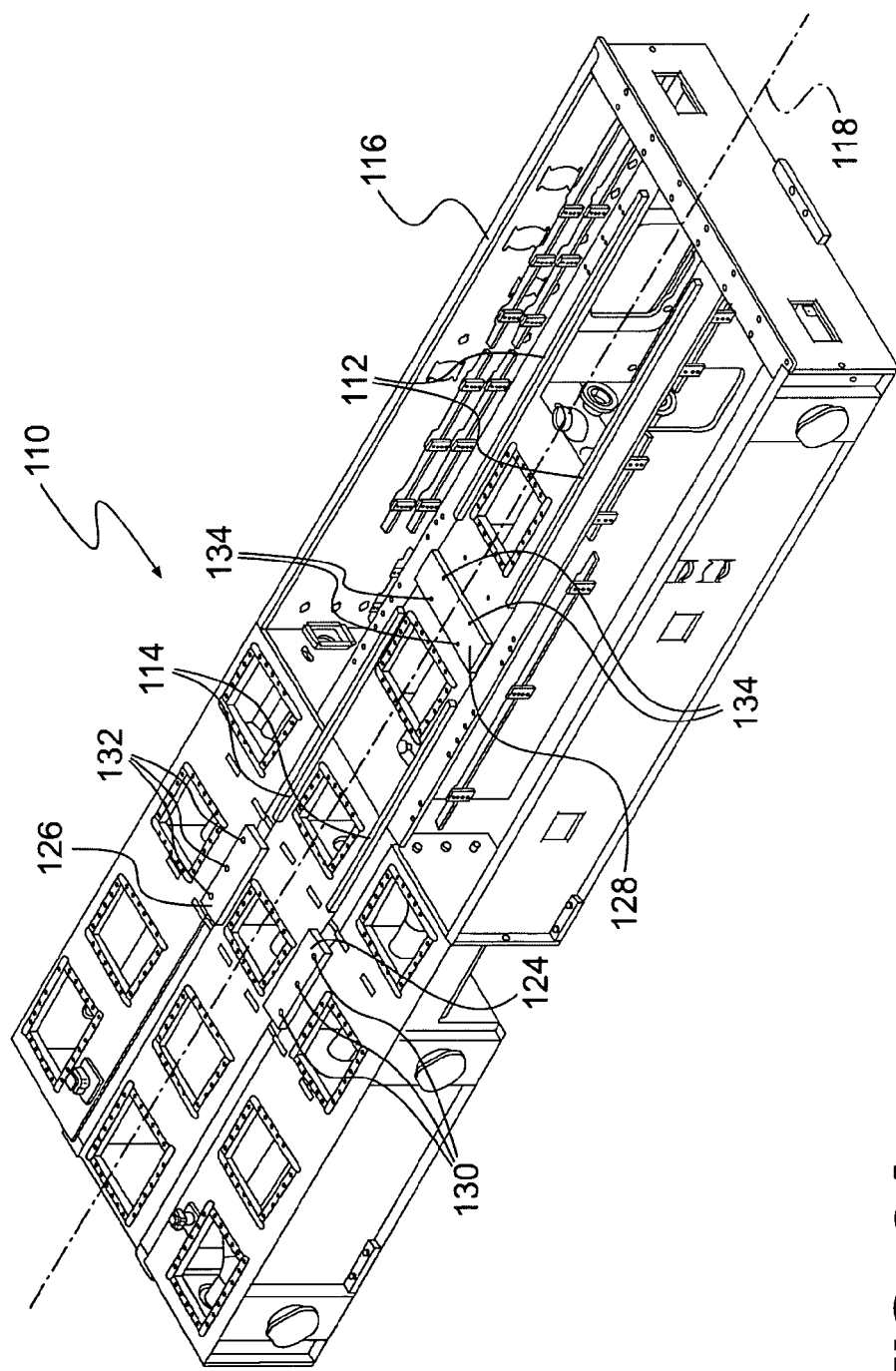
FIG. 6A is a perspective view of a second embodiment of a support system according to the present disclosure in one state of assembly.
Figure 6B:
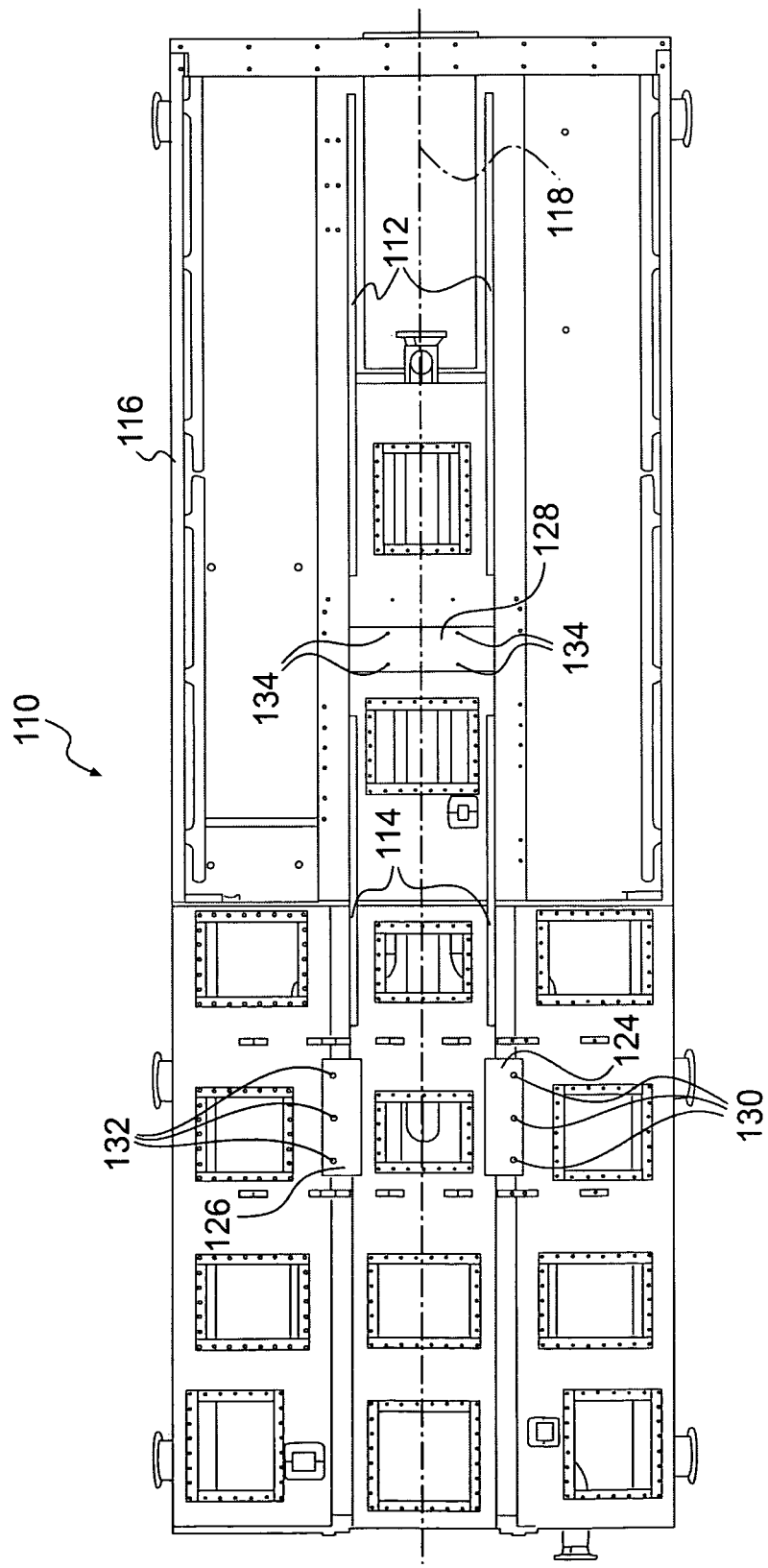
FIG. 6B is a plan view of the structure shown in FIG. 6A.

FIGS. 6A, 6B, 7A-7F, 8A-8C, 9, 10A-10D, 11, 12A, 12B, 13, and 14A-C show various states of assembly of a second embodiment of a support system 110 and a power system 180 that includes support system 110 and a gas turbine engine 182. FIGS. 6A and 6B show a base/support 116 of support system 110. Base/support 116 may be a frame. Base/support 116 may be supported by various entities, including, but not limited to, the ground (not shown), one or more structures supported by the ground (not shown), one or more structures of a vehicle (not shown), and/or one or more structures of a marine vessel (not shown).

Figure 7C:
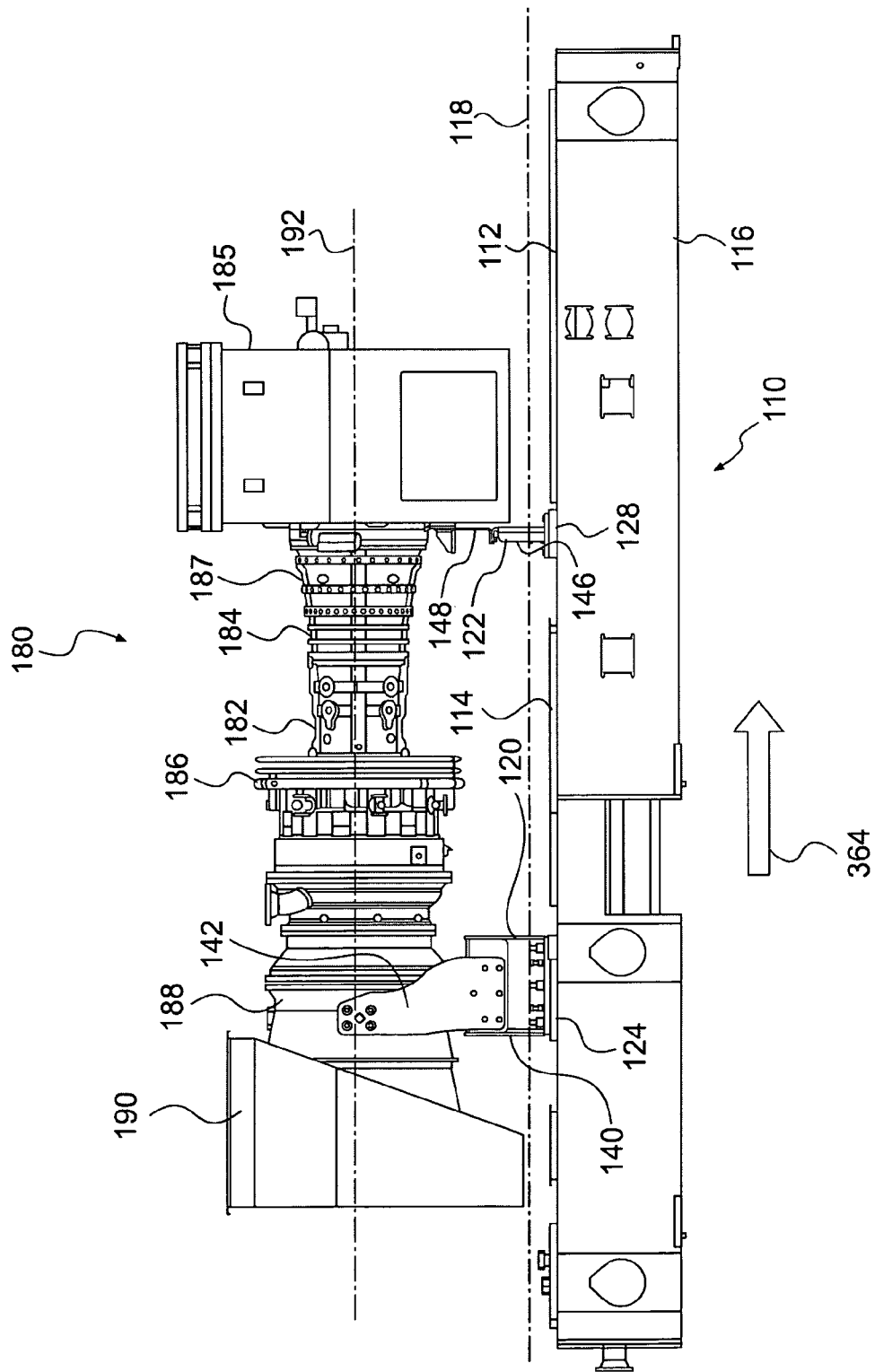
FIG. 7C is an elevational view of the structure shown in FIG. 7A.
Figure 7D:
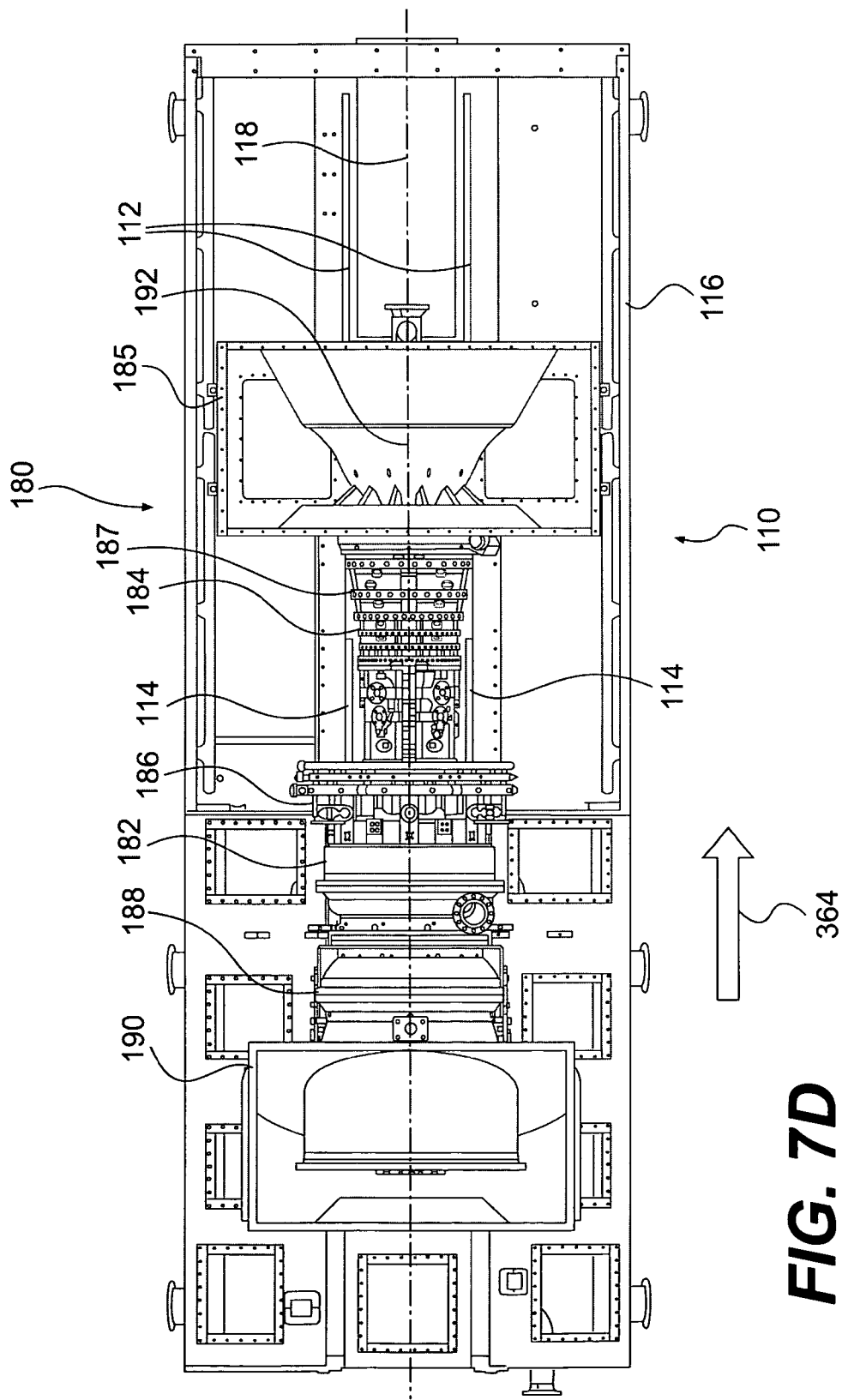
FIG. 7D is a plan view of the structure shown in FIG. 7A.
Figure 7E:
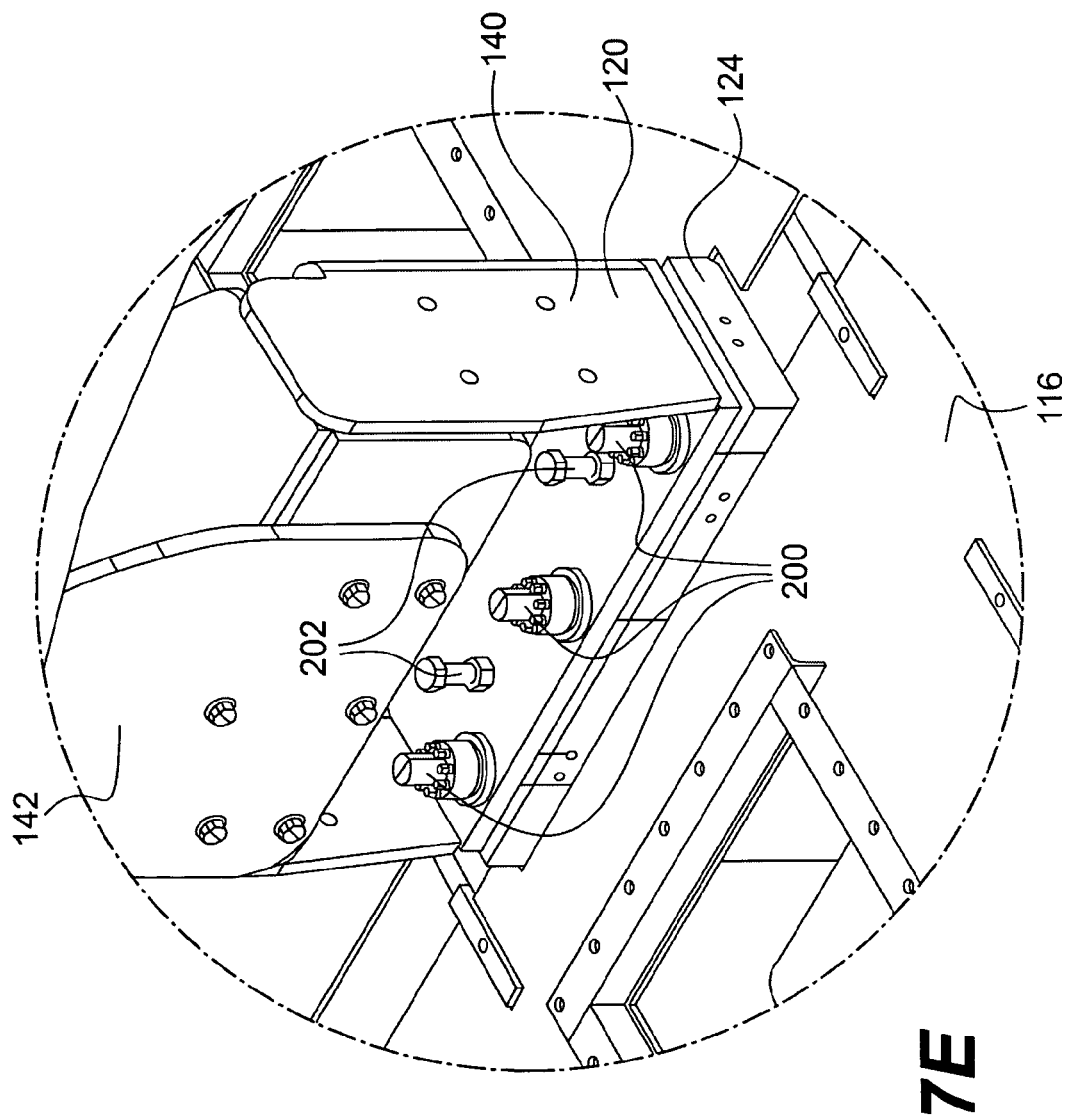
FIG. 7E is an enlarged view of the portion of FIG. 7A shown in circle 7E.
Figure 7F:
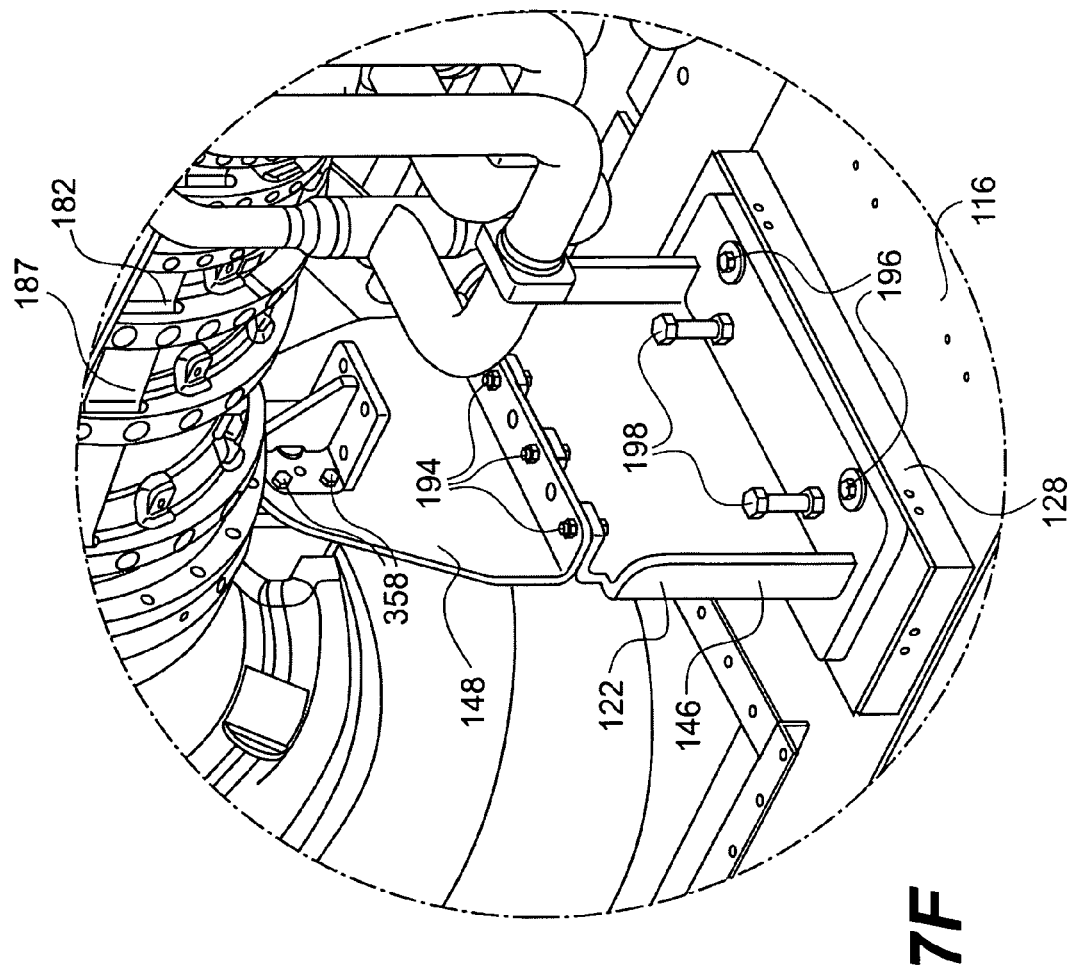
FIG. 7F is an enlarged view of the portion of FIG. 7B shown in circle 7F.

FIGS. 7A-7F show gas turbine engine 182 mounted to base/support 116. FIGS. 7A and 7B provide perspective views of gas turbine engine 182 and base/support 116 from opposite sides; FIG. 7C provides an elevational view of gas turbine engine 182 and base/support 116; FIG. 7D provides a plan view of gas turbine engine 182 and base/support 116; FIG. 7E provides an enlarged view of the portion of FIG. 7A shown in circle 7E; and FIG. 7F provides an enlarged view of the portion of FIG. 7B shown in circle 7F. As best seen in FIG. 7C, gas turbine engine 182 may include a gas producer 184, a combustor 186, a power-turbine section 188, and an exhaust collector 190 disposed along a longitudinal axis 192 of gas turbine engine 182. Gas producer 184 may include intake ducting 185 and a compressor 187.

Gas turbine engine 182 and each component and section thereof may have a forward end portion and an aft end portion. The forward end of each gas turbine engine 182 and each component and section thereof may be the end furthest in a forward direction 364. For purposes of this disclosure, forward direction 364 is considered to be a direction opposite the direction in which compressed air flows within compressor 187 during operation of gas turbine engine 182, which in the embodiment of the gas turbine engine shown in FIGS. 7A-7F, is also the direction from power turbine section 188 toward compressor 187.

As best seen in FIGS. 7A-7C, support system 110 may include engine supports 120, 122 that support gas turbine engine 182 from base/support 116. Engine supports 120, 122 may be spaced from one another in the direction of an axis 118, and longitudinal axis 192 of gas turbine engine 182 may extend substantially parallel to axis 118. Engine supports 120, 122 may have any suitable configuration for supporting a gas turbine engine. In some embodiments, engine support 120 may include a lower portion 140 that engages a support structure 124 (FIGS. 6A, 6B, 7A) and a support structure 126 (FIGS. 6A, 6B, 7B) on base/support 116; a first upwardly extending arm 142 (FIG. 7A) that connects to one side of power-turbine section 188; and a second upwardly extending arm 144 (FIG. 7B) that connects to the opposite side of power-turbine section 188 in the same general manner.

Support structures 124, 126 may have various configurations, and support system 110 may include various provisions for releasably securing lower portion 140 of engine support 120 to support structures 124, 126. As FIGS. 6A and 6B show, in some embodiments, support structures 124, 126 may each be mounting pads having holes 130, 132 for receiving fasteners. Referring to FIG. 7E, support system 110 may include fasteners 200 that register with holes 130 of support structure 124 and releasably secure lower portion 140 of engine support 120 to support structure 124. Similarly, referring to FIG. 12B, support system 110 may include fasteners 200 that register with holes 132 and releasably secure lower portion 140 of engine support 120 to support structure 126.

As best shown in FIGS. 7B, 7C, and 7F, engine support 122 may include a lower portion 146 that engages a support structure 128 on base/support 116 and an upper portion 148 that engages compressor 187. Lower portion 146 and upper portion 148 of engine support 122 may be releasably engaged to one another using various means. For example, as FIG. 7F shows, fasteners 194 may releasably secure upper portion 148 to lower portion 146. Support structure 128 may have various configurations, and engine support 122 may be secured to support structure 128 in various manners. As FIGS. 6A and 6B show, in some embodiments, support structure 128 may be a mounting pad with holes 134 for receiving fasteners. As FIG. 7F shows, in some embodiments, lower portion 146 of engine support 122 may rest on support structure 128 with fasteners 196 registering with holes 134 and releasably securing engine support 122 to support structure 128. With engine supports 120, 122 engaged to base/support 116 and gas turbine engine 182 in the manner shown in FIGS. 7A-7F, engine supports 120, 122 may support gas turbine engine 182 in a substantially fixed position relative to base/support 116.

Figure 12B:
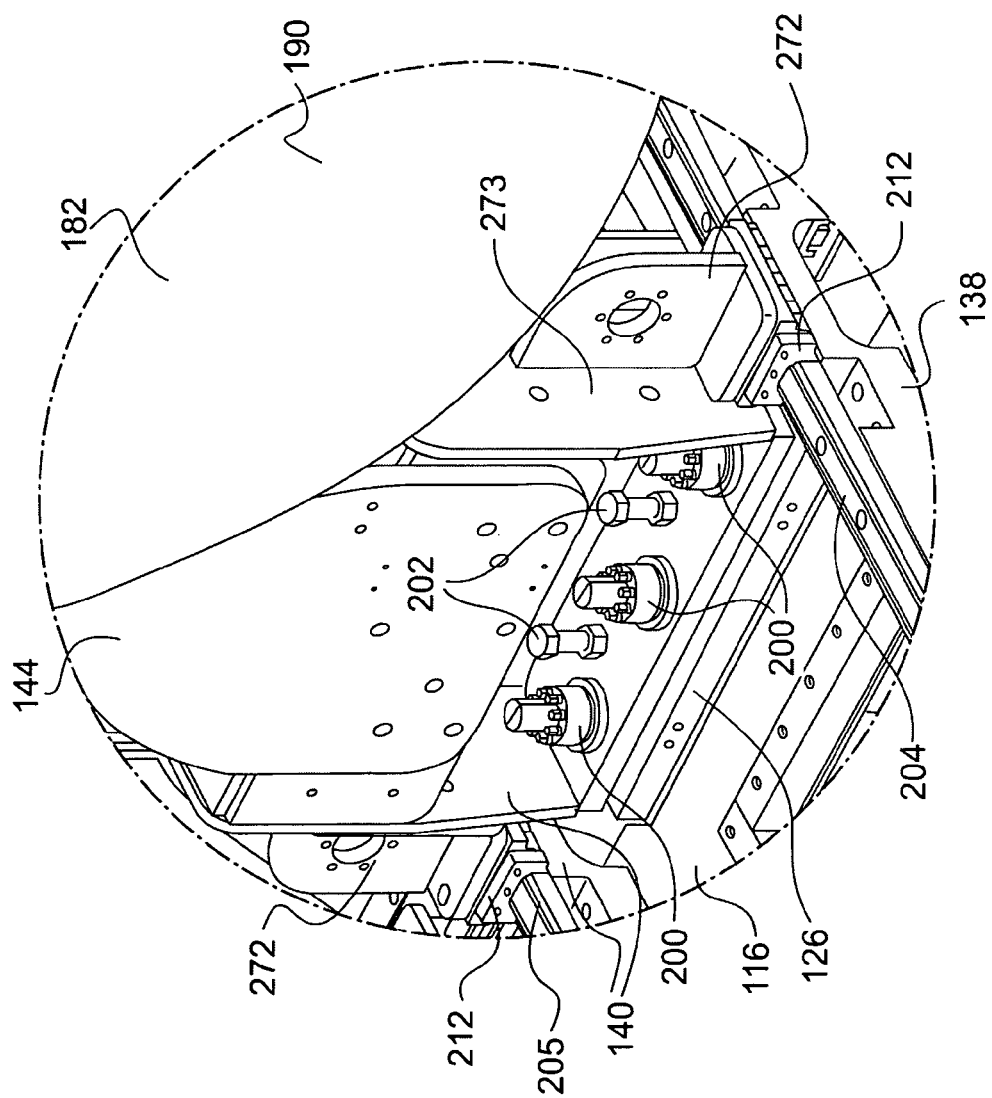
FIG. 12B is an enlarged view of the portion of FIG. 12A shown in circle 12B.
Figure 13:
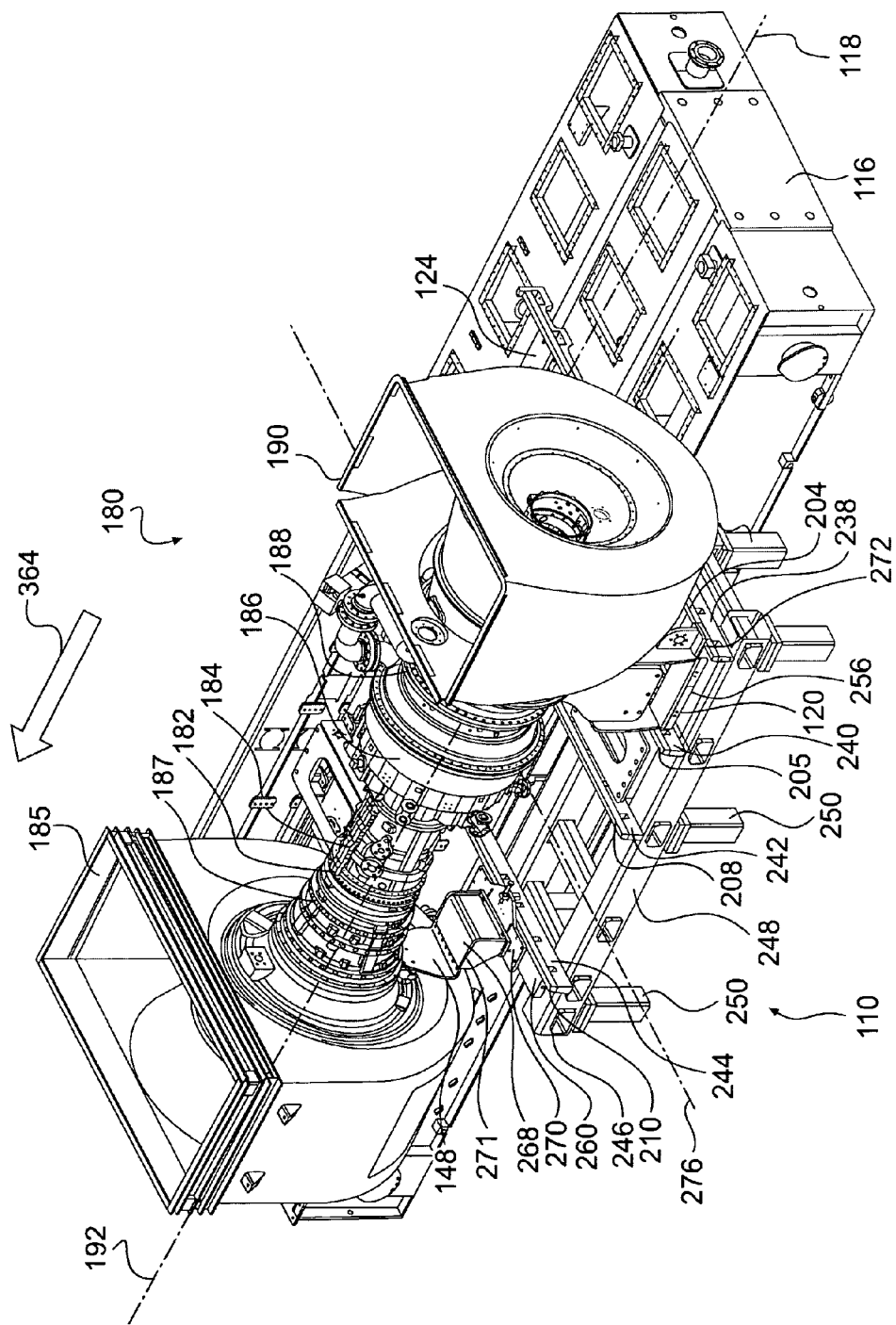
FIG. 13 is a perspective view of the power system shown in FIG. 7A in another state.

Support system 110 may also include various provisions for moving gas turbine engine 182 as a unit and/or moving one or more portions of gas turbine engine 182 separately from other portions, which provisions may be employed when gas turbine engine 182 is not running. In some embodiments, support system 110 may include provisions for lifting engine support 120 and thereby lifting power-turbine section 188. For example, as FIG. 7E shows, support system 110 may include jacking bolts 202 for lifting the portion of engine support 120 engaged to support structure 124. Similarly, as FIG. 12B shows, support system 110 may include jacking bolts 202 for lifting the portion of engine support 120 engaged to support structure 126. Of course, it may be necessary to loosen or remove fasteners 200 before using such jacking bolts to lift engine support 120 and power-turbine section 188.

Support system 110 may also include provisions for lifting engine support 122 and thereby lifting gas producer 184. For example, support system 110 may include jacking bolts 198 for lifting engine support 122 and gas producer 184 relative to support structure 128. Of course, it may be necessary to loosen or remove fasteners 196 before jacking bolts 198 can be used to lift engine support 122 and gas producer 184.

Figure 8A:
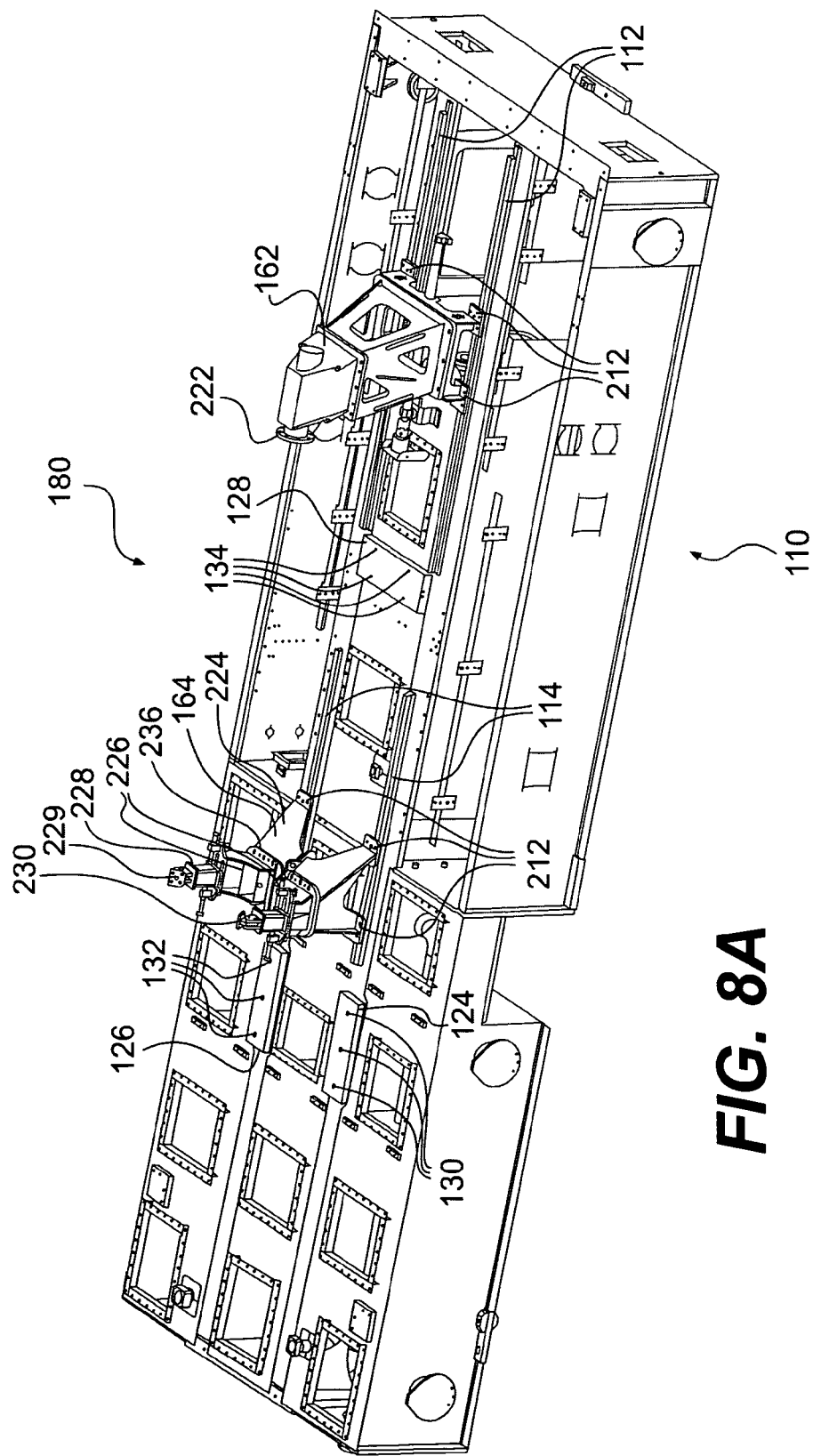
FIG. 8A is a perspective view of the second embodiment of the support system in another state of assembly.
Figure 8B:
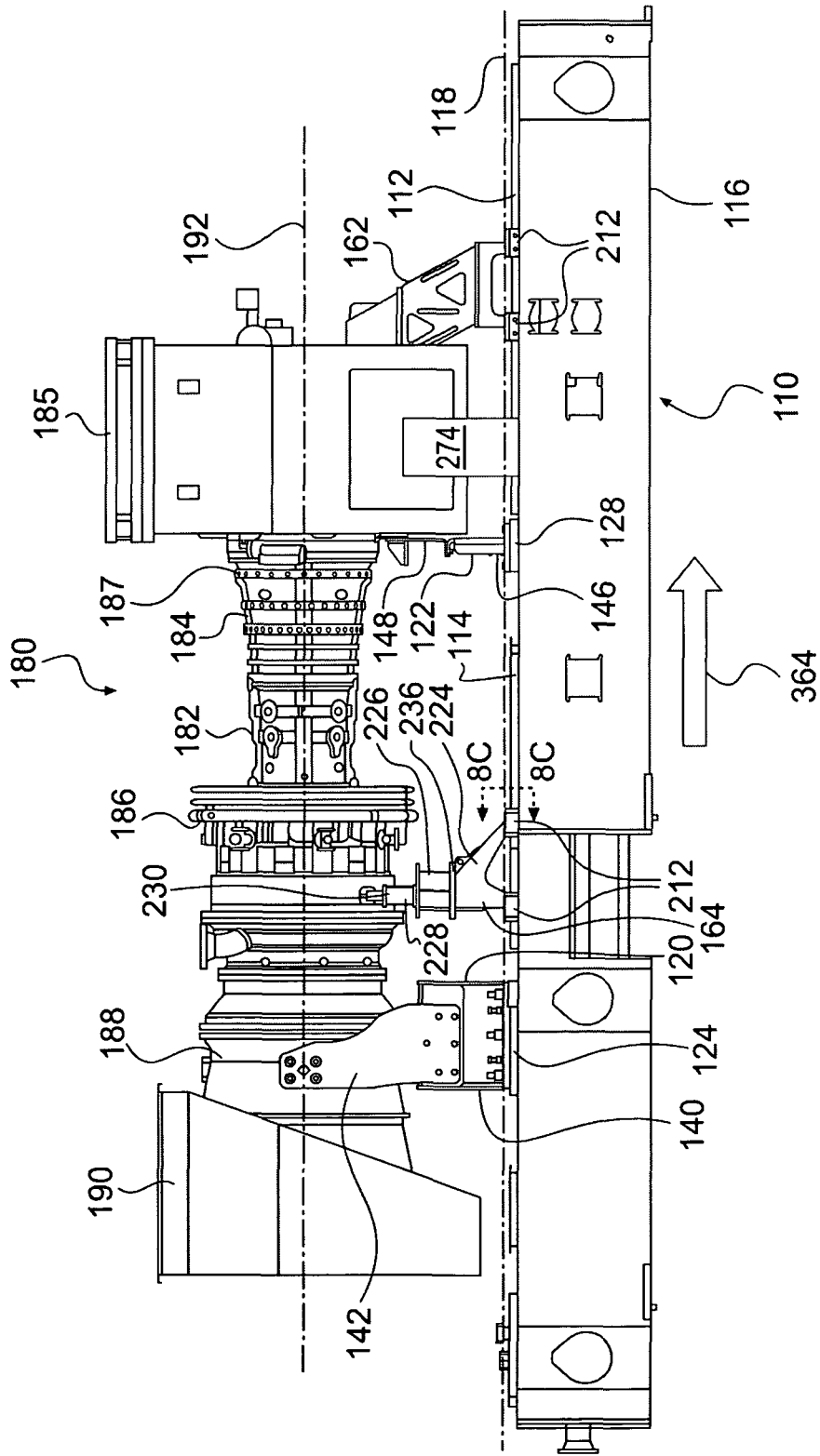
FIG. 8B is an elevational view of the power system shown in FIG. 7A in another state.
Figure 8C:
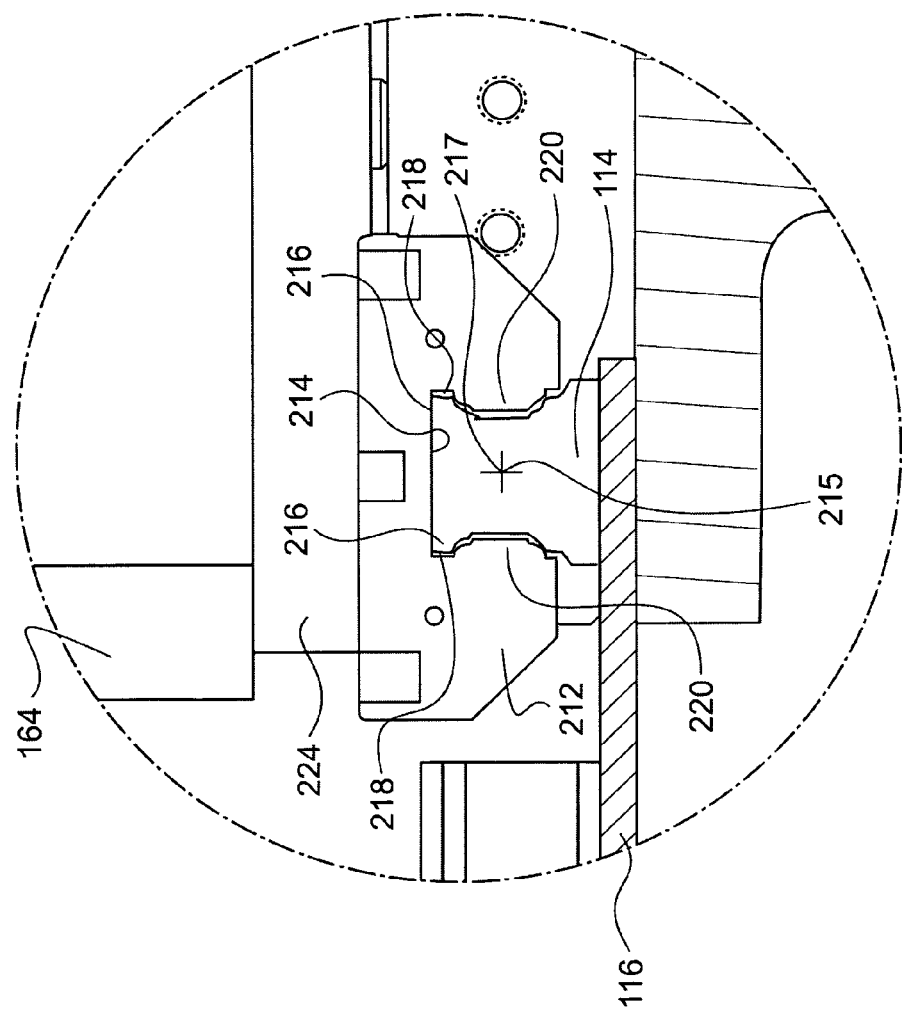
FIG. 8C is a sectional view through line 8C-8C of FIG. 8B.

Like support system 10, support system 110 may include guide tracks and provisions for suspending one or more portions of gas turbine engine 182 from those guide tracks. For example, as best shown in FIGS. 8A-8C, support system 110 may include a first pair of guide tracks 112 and a moveable support 162 for suspending a portion of gas turbine engine 182 from guide tracks 112, as well as a pair of guide tracks 114 and a moveable support 164 for suspending another portion of gas turbine engine 182 from guide tracks 114. Guide tracks 112, 114 may be mounted to base/support 116 extending substantially parallel to axis 118 and longitudinal axis 192 of gas turbine engine 182. Moveable supports 162, 164 may be left on guide tracks 112, 114 at all times, or moveable supports 162, 164 may be removed from guide tracks 112, 114 when they are not needed. Similarly, guide tracks 112, 114 may form a permanent part of base/support 116, or guide tracks 112, 114 may be releasably secured to base/support 116, so that guide tracks 112, 114 may be removed from base/support 116 when they are not needed.

Guide tracks 112, 114 and moveable supports 162, 164 may be configured to engage one another in such a way that guide tracks 112, 114 direct moveable supports 162, 164 along a predetermined path of travel, such as parallel to axes 192, 118. Various complementary configurations of guide tracks 112, 114 and moveable supports 162, 164 may provide this result. As FIGS. 8A-8C show, in some embodiments, guide tracks 112, 114 may be rails, and each moveable support 162, 164 may include sliders 212 configured to engage and slide along guide tracks 112, 114. As best shown in FIG. 8C, each slider 212 may include a channel 214 extending through the slider 212 along an axis 215. The channel 214 of each slider 212 may be configured to receive a guide track 112, 114 with a longitudinal axis 217 of the guide track 112, 114 extending through the channel 214 substantially parallel with the axis 215 of the channel 214. Each guide track 112, 114 may include flanges 216 extending transversely outward relative to its longitudinal axis 217. For receiving flanges 216, the channel 214 of each slider 212 may include recesses 218 that also extend transversely outward relative to the axis 215 of the channel 214. Below each recess 218, each slider 212 may have flanges 220 extending transversely inward relative to the axis 215 of the channel 214, thereby engaging flanges 216 in a manner limiting vertical movement of the slider 212 relative to the guide track 112, 114 extending through the channel 214.

Figure 14A:
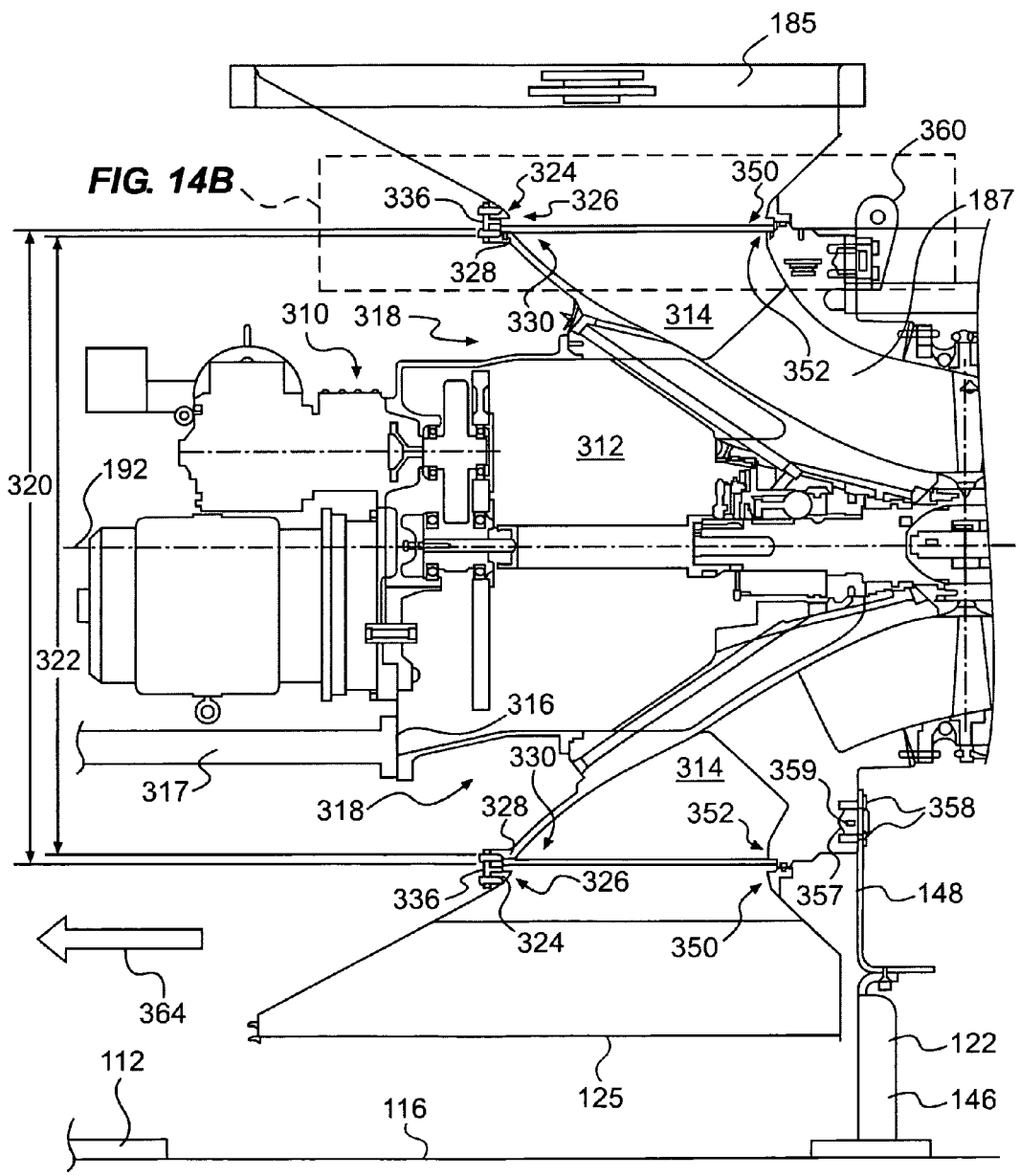
FIG. 14A is a partial cross-sectional, side view of the power system shown in FIG. 8B, wherein the power system is in one state.

Each moveable support 162, 164 may be used to support various portions of gas turbine engine 182. As shown in FIGS. 8A and 14C, in some embodiments, moveable support 162 may include a flange 222 configured to be fastened to and support a forward end portion 310 of compressor 187. As shown in FIGS. 14A and 14C, compressor 187 may, for example, include an auxiliary gear box 312 and an air inlet housing 314 mounted at forward end portion 310 of compressor 187. Auxiliary gear box 312 may include a pipe connection 316, for example, for connecting to a removable pipe 317. Removable pipe 317 may serve to drain fluid from auxiliary gear box 312. More specifically, removable pipe 317 may drain oil from a bearing assembly of auxiliary gear box 312. Pipe connection 316 may, for example, include a radially extending annular flange with a plurality of fastener holes therein, and flange 222 may also be a radially extending annular flange with mating fastener holes. When removable pipe 317 is disconnected and removed from pipe connection 316, flange 222 on moveable support 162 may be fastened, for example, to pipe connection 316, for example, via one or more fasteners, e.g., bolts (not shown) secured through the mating fastener holes of the radially extending annular flange of pipe connection 316 and flange 222. The same mounting features on pipe connection 316 (e.g., bolt holes) used to secure flange 222 to pipe connection 316 may be also be used to secure removable pipe 317 to pipe connection 316. It is contemplated that six bolts may be used to fasten flange 222 to pipe connection 316; however, any suitable number of fasteners may be used to fasten flange 222 to pipe connection 316. When flange 222 is fastened to forward end portion 310 of compressor 187 to support gas producer 184 from guide tracks 112, moveable support 162 may initially be disposed in the position shown in FIG. 8B.

As best shown in FIG. 8B, moveable support 164 may be configured to cradle an outer surface of combustor 186. Moveable support 164 may include a lower portion 224 that rides on sliders 212, a middle portion 226 mounted to lower portion 224, and an upper portion 228 mounted to middle portion 226. Upper portion 228 of moveable support 164 may include a pair of uprights 229, 230 configured to cradle opposite sides of combustor 186. Various means, such as fasteners, may be used to secure each upright 229, 230 to combustor 186.

Uprights 229, 230 and middle portion 226 of moveable support 164 may be secured to one another in various ways. In some embodiments, moveable support 164 may be configured in a manner allowing either holding each upright 229, 230 in a fixed position relative to middle portion 226 or allowing one or both of uprights 229, 230 to move relative to middle portion 226 while supporting combustor 186 from middle portion 226. This may be accomplished in various ways. In some embodiments, moveable support 164 may include one or more mounting slots that receive fasteners for securing an upright 229, 230 to middle portion 226 of moveable support 164.

Figure 10A:
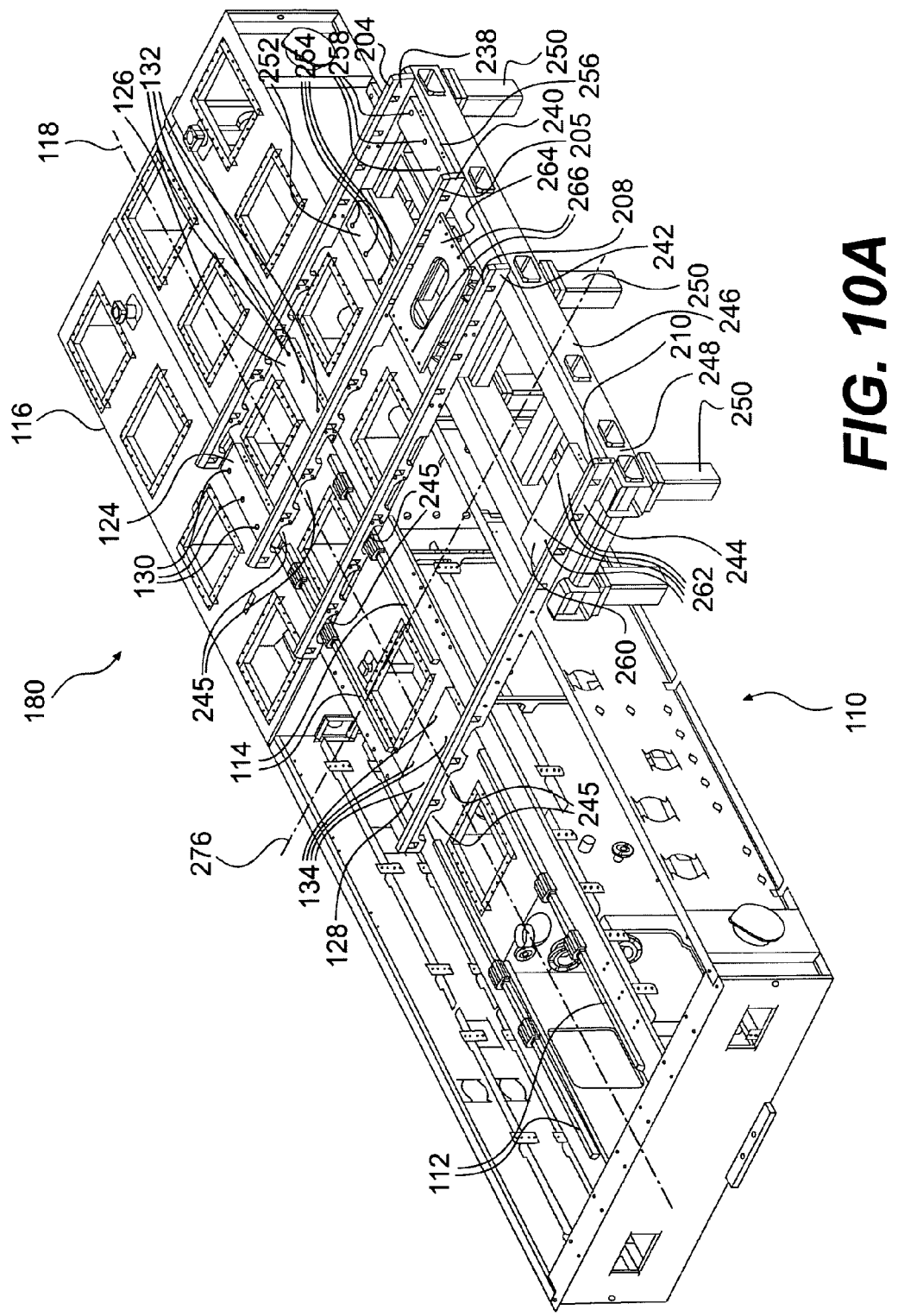
FIG. 10A is a perspective view of the second embodiment of the support system in another state of assembly.
Figure 10C:
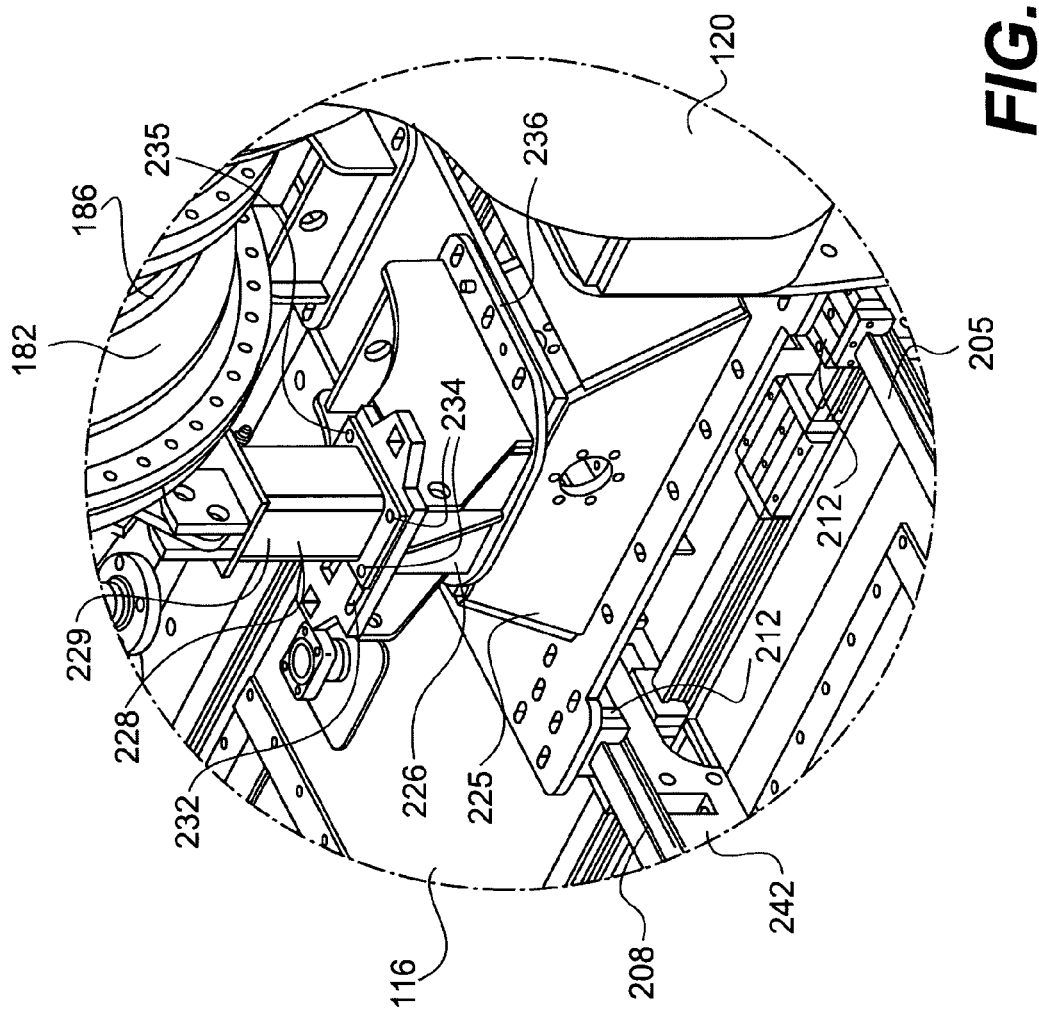
FIG. 10C is an enlarged view of the portion of FIG. 10B shown in circle 10C.

One example of such a configuration is shown in detail in FIG. 10C. In this embodiment, middle portion 226 of moveable support 164 may include a mounting slot 232 that registers with mounting holes 234 on an outboard side of the base of upright 229. Middle portion 226 of moveable support 164 may include a similar mounting slot (not shown) that extends parallel to mounting slot 232 and registers with mounting holes 235 (only one shown in FIG. 10C) on an inboard side of the base of upright 229. To secure upright 229 to middle portion 226 of moveable support 164, fasteners (not shown) may be secured through each mounting hole 234 and mounting slot 232, as well as through each mounting hole 235 and the associated mounting slot of middle portion 226. To hold upright 229 in a fixed position relative to middle portion 226, these fasteners may be tightened to firmly clamp upright 229 to middle portion 226. To allow upright 229 to slide on middle portion 226 in the direction of mounting slot 232 while supporting combustor 186, these fasteners may be loosened slightly. Middle portion 226 may similarly include mounting slots (not shown) for securing upright 230 to middle portion 226, so that upright 230 may also be held in a fixed position relative to middle portion 226 or allowed to move relative to middle portion 226 while supporting combustor 186.

The ability of uprights 229, 230 to simultaneously move relative to middle portion 226 while supporting combustor 186 may allow supporting combustor 186 with uprights 229, 230 while moving combustor 186 relative to middle portion 226 and lower portion 224. The configuration of moveable support 164 may allow movement of uprights 229, 230 and combustor 186 in various directions relative to middle portion 226. In some embodiments, mounting slot 232 and the other mounting slots used to secure uprights 229, 230 to middle portion 226 may extend substantially parallel to the longitudinal axis 192 of gas turbine engine 182. This may allow supporting combustor 186 with uprights 229, 230 while sliding uprights 229, 230 and combustor 186 along the longitudinal axis 192 of gas turbine engine 182.

Figure 11:
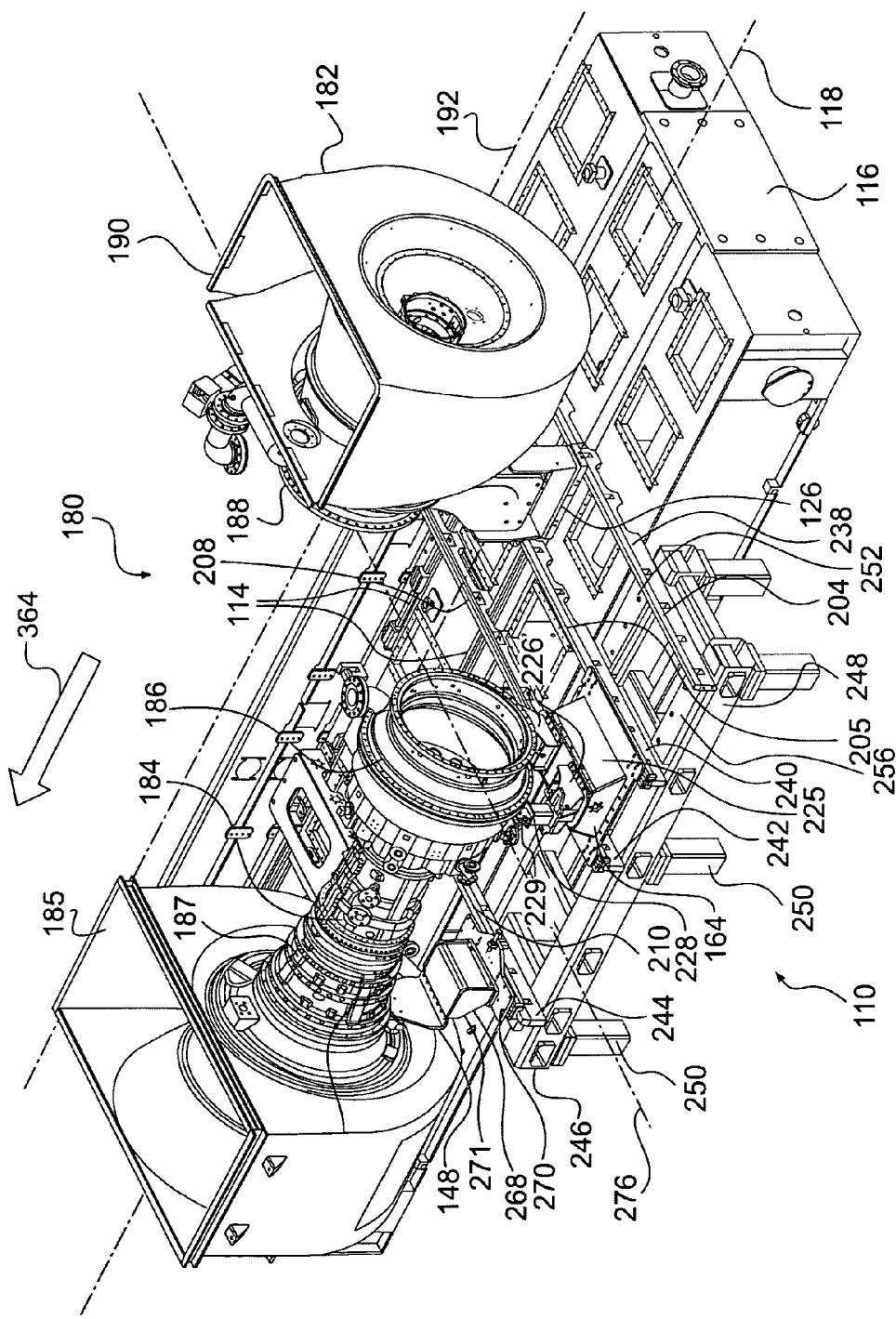
FIG. 11 is a perspective view of the power system shown in FIG. 7A in another state.

Middle portion 226 and lower portion 224 of moveable support 164 may connect to one another in various ways. As FIGS. 8A-8C show, in some embodiments, middle portion 226 and lower portion 224 may mate with one another at an interface 236, and middle portion 226 and lower portion 224 may be releasably secured to one another, such as with fasteners (not shown). Additionally, support system 110 may include one or more alternative lower portions that middle portion 226 and upper portion 228 of moveable support 164 may be mounted to instead of lower portion 224. For example, FIGS. 10B, 10C, and 11 show moveable support 164 assembled with upper portion 228 and middle portion 226 mounted to a lower portion 225 having a different configuration than the lower portion 224 shown in FIGS. 8A-8C. As will be discussed further below, lower portion 224 may be used in some circumstances, and lower portion 225 may be used in other circumstances.

As FIG. 8B shows, in addition to engine supports 120, 122 and moveable supports 162, 164, support system 110 may include a support 274 that may be used to support intake ducting 185 during certain maintenance and repair operations. Support 274 may be, for example, a cradle that may be inserted between base/support 116 and lower surfaces of intake ducting 185 to support intake ducting 185. During operation of gas turbine engine 182, intake ducting 185 may connect to compressor 187 in a manner such that support 274 is not needed to help hold intake ducting 185. However, as is discussed in more detail below, during certain maintenance and repair operations, it may be desirable to release the engagements between intake ducting 185 and compressor 187 to allow moving compressor 187 relative to intake ducting 185. In such circumstances, before the engagements between intake ducting 185 and compressor 187 are released, support 274 may be put in place to hold intake ducting 185.

In addition to guide tracks 112, 114, support system 110 may include various other guide tracks for supporting one or more portions of gas turbine engine 182. For example, as FIG. 10A shows, support system 110 may include guide tracks 204, 205, 208, and 210. Each guide track 204, 205, 208, 210 may have various configurations. In some embodiments, each guide track 204, 205, 208, 210 may have the same construction as the configuration of guide tracks 112, 114 discussed above in connection with FIG. 8C. In some embodiments, each guide track 204, 205, 208, 210 may be attached to a support beam 238, 240, 242, 244. Support beams 238, 240, 242, 244 may include apertures 245 that open downwardly on a side of the support beam 238, 240, 242, 244 opposite the guide track 204, 205, 208, 210 mounted thereto.

Support system 110 may include various provisions for supporting guide tracks 204, 205, 208, 210 and support beams 238, 240, 242, 244 adjacent gas turbine engine 182, so that gas turbine engine 182 may be suspended from one or more of guide tracks 204, 205, 208, 210. In some embodiments, base/support 116 may be used to support one end of each guide track 204, 205, 208, 210 and support beam 238, 240, 242, 244, and a support 246 may be used to support the other end of each guide track 204, 205, 208, 210 and support beam 238, 240, 242, 244. As is discussed in more detail below, various combinations of one or more of guide tracks 204, 205, 208, 210 and support beams 238, 240, 242, 244 may be used to support one or more portions of gas turbine engine 182 during maintenance and repair operations. When gas turbine engine 182 is operating, guide tracks 204, 205, 208, 210 and support beams 238, 240, 242, 244 may or may not be mounted to base/support 116 and support 246. In fact, when gas turbine engine 182 is running, guide tracks 204, 205, 208, 210 and support beams 238, 240, 242, 244, as well as support 246, may be used for maintenance and repair operations on other gas turbine engines.

Support 246 may include a frame 248 and legs 250. In some embodiments, legs 250 may have a height such that the upper side of frame 248 sits at roughly the same height as the upper side of base/support 116. Frame 248 may include provisions similar to base/support 116 for mounting gas turbine engine 182 or portions thereof. For example, frame 248 may include a support structure 252 and holes 254 that are substantially the same as support structure 124 and holes 130. Similarly, frame 248 may include a support structure 256 and holes 258 that are substantially the same as the support structure 126 and holes 132 of base/support 116. Frame 248 may also include a support structure 260 and holes 262 that are substantially the same as support structure 128 and holes 134. Additionally, the relative positioning of support structures 252, 256, 260 and holes 254, 258, 262 on frame 248 may be substantially the same as the relative positioning of support structures 124, 126, 128 and holes 130, 132, 134 on base/support 116.

Frame 248 may also include a support structure 264 and holes 266 configured to mate with and support the configuration of moveable support 164 shown in FIGS. 10B, 10C, and 11. Specifically, support structure 264 and holes 266 may be configured to mate with and support lower portion 225 of this version of moveable support 164.

In some embodiments, support 246 may include provisions for adjusting the height of frame 248 relative to the surface that legs 250 rest on. For example, support 246 may include one or more jacking mechanisms (not shown) for raising and lowering one or more of legs 250. In some embodiments, support 246 may include jacking mechanisms operable to raise and lower different legs 250 independently of one another to adjust the angle of frame 248 relative to the support surface under legs 250 and/or accommodate unevenness in the underlying support surface.

Support system 110 may also include provisions for facilitating movement of frame 248 (when guide tracks 204, 205, 208, 210 and their support beams 238, 240, 242, 244 are not mounted across base/support 116 and frame 248). For example, support system 110 may include transport wheels (not shown) for rolling frame 248 around. Such transport wheels may be attached to frame 248 and/or legs 250 in such a manner that the wheels may be lowered to contact the ground when it is desired to move frame 248. Alternatively, such transport wheels may be removable wheels that may be attached to frame 248 and/or legs 250 when it is desired to move frame 248. Similarly, support system 110 may include a retractable or removable hitch structure (not shown) for frame 248, which hitch structure may be used to pull frame 248 on the transport wheels.

Support system 110 may include various provisions for suspending gas turbine engine 182 and/or portions thereof from one or more of guide tracks 204, 205, 208, 210. FIGS. 10A-10D and 11 show combustor 186 and gas producer 184 of gas turbine engine 182 suspended from guide tracks 205, 208, and 210, while power-turbine section 188 and exhaust collector 190 remain supported from base/support 116 by support structures 124, 126 and engine support 120. For suspending combustor 186 from guide tracks 205, 208, support system 110 may include a plurality of sliders 212 that may be engaged to guide tracks 205, 208 and fixedly secured to lower portion 225 of moveable support 164 to slideably support moveable support 164 on guide tracks 205, 208. In addition to the two sliders 212 shown engaged to guide tracks 205, 208 and secured to lower portion 225 in FIG. 10C, support system 110 may include one or more other sliders 212 for supporting lower portion 225 from guide tracks 205, 208. For example, support system 110 may include two other sliders 212 for supporting the side of lower portion 225 not shown in FIG. 10C from guide tracks 205, 208. The configuration of the sliders 212 for supporting lower portion 225 of moveable support 164 and the manner in which they engage guide tracks 205, 208 may be substantially the same as the configuration of the slider 212 shown in FIG. 8C and the manner in which it engages the guide track 114 shown therein.

Figure 10D:
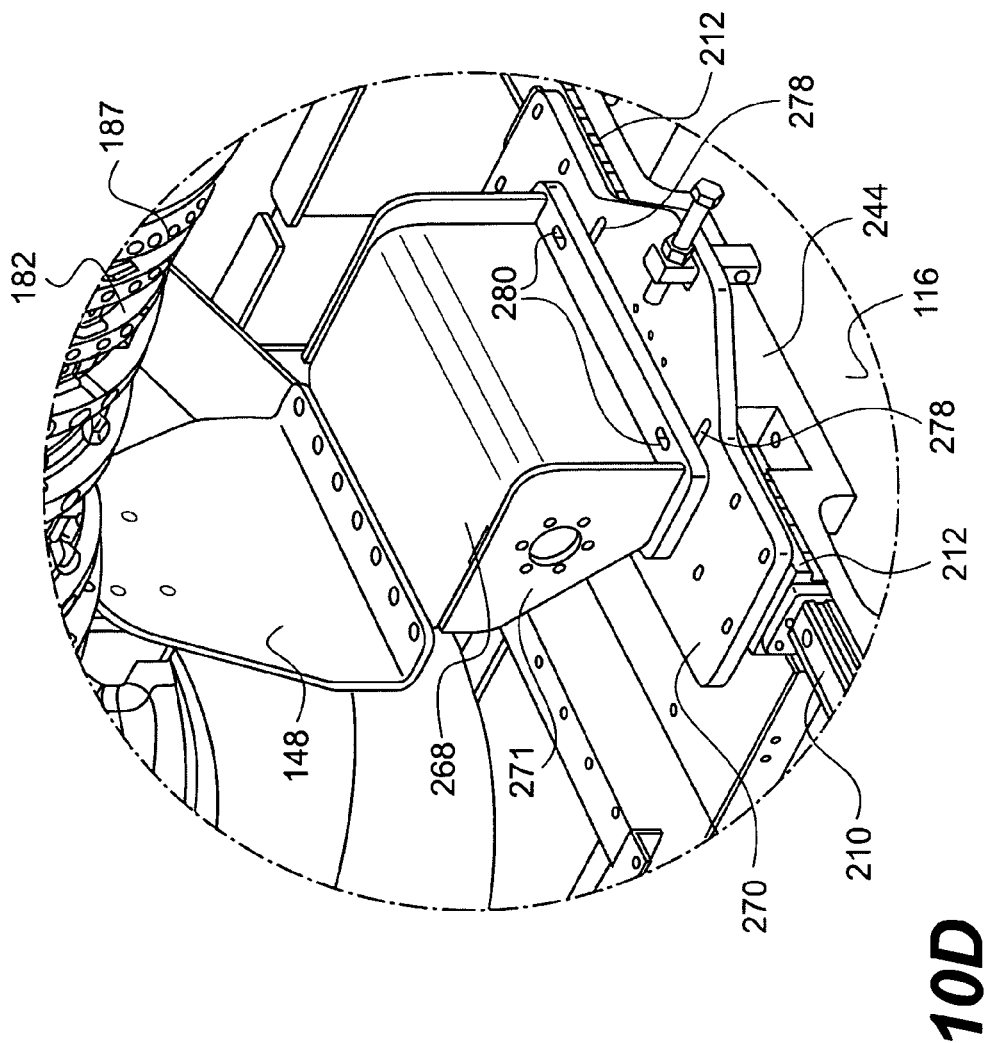
FIG. 10D is an enlarged view of the portion of FIG. 10B shown in circle 10D.

As best shown in FIG. 10D, for supporting gas producer 184 from guide track 210, support system 110 may include sliders 212 and brackets 268, 270. Sliders 212 may be engaged to guide track 210. Brackets 268, 270 may be fixedly secured to upper portion 148 of engine support 122 in place of lower portion 146. Additionally, bracket 270 may be fixedly secured to sliders 212. Engaged to one another in this manner, upper portion 148 of engine support 122, brackets 268, 270, and sliders 212 may suspend gas producer 184 from guide track 210. The configuration of these sliders 212 and the manner in which they engage guide track 210 may be the same as the configuration of the slider 212 shown in FIG. 8C and the manner in which it engages the guide track 114 shown therein. When assembled to one another in the manner shown in FIG. 10D, upper portion 148 of engine support 122, bracket 268, bracket 270, and sliders 212 may form a moveable support 271 for supporting gas producer 184 from guide track 210.

The engagements between upper portion 148 of engine support 122, bracket 268, and bracket 270 may constrain relative movement between gas producer 184 and bracket 270 in various ways. In some embodiments, support system 110 may have provisions that allow either holding a fixed positional relationship between gas producer 184 and bracket 270 or moving gas producer 184 relative to bracket 270 while gas producer 184 is supported from bracket 270 with bracket 268 and upper portion 148 of engine support 122. One embodiment of such provisions is illustrated in FIG. 10D. Specifically, in the embodiment shown in FIG. 10D, the provisions for securing brackets 268, 270 to one another include mounting slots 278 in bracket 270 and corresponding mounting holes 280 in bracket 268. Brackets 268, 270 may be secured to one another by securing fasteners (not shown) through mounting slots 278 and mounting holes 280. If it is desired to hold a fixed positional relationship between gas producer 184 and bracket 270, the fasteners secured through mounting slots 278 and mounting holes 280 may be tightened to firmly clamp brackets 268, 270 together. Alternatively, if it is desired to allow movement of gas producer 184 relative to bracket 270 while supporting gas producer 184 from bracket 270 with bracket 268 and upper portion 148 of engine support 122, the fasteners secured through mounting slots 278 and mounting holes 280 may be loosened slightly. This may allow movement of bracket 268, and thus gas producer 184, relative to bracket 270 in the directions of mounting slots 278.

Mounting slots 278 may have various shapes and orientations to constrain movement of gas producer 184 relative to bracket 270 in various ways. In some embodiments, mounting slots 278 may extend substantially parallel to axes 118, 192. This may allow moving gas producer 184 in either direction along axes 118, 192 relative to bracket 270.

FIGS. 12A and 12B show gas turbine engine 182 suspended as a unit from guide tracks 204, 205, and 210. Gas producer 184 may be suspended from guide track 210 in the same manner as shown in FIGS. 10B and 10D. Additionally, engine support 120, power-turbine section 188, and exhaust collector 190 may be suspended from guide tracks 204, 205. As is best shown in FIG. 12B, the provisions for suspending engine support 120, power-turbine section 188, and exhaust collector 190 from guide tracks 204, 205 may include sliders 212 that engage guide tracks 204, 205 and brackets 272 for suspending engine support 120 from those sliders 212. In addition to the sliders 212 and brackets 272 shown in FIG. 12B, support system 110 may have an additional pair of sliders 212 and brackets 272 for suspending the opposite side of engine support 120 (the side disposed above support structure 124) from guide tracks 204, 205. The configuration of these sliders 212 and the manner in which they engage guide tracks 204, 205 may be the same as the configuration of the slider 212 shown in FIG. 8C and the manner in which it engages the guide track 114 shown therein. Brackets 272 may have any suitable configuration for suspending engine support 120 from guide tracks 204, 205.

Figure 14B:
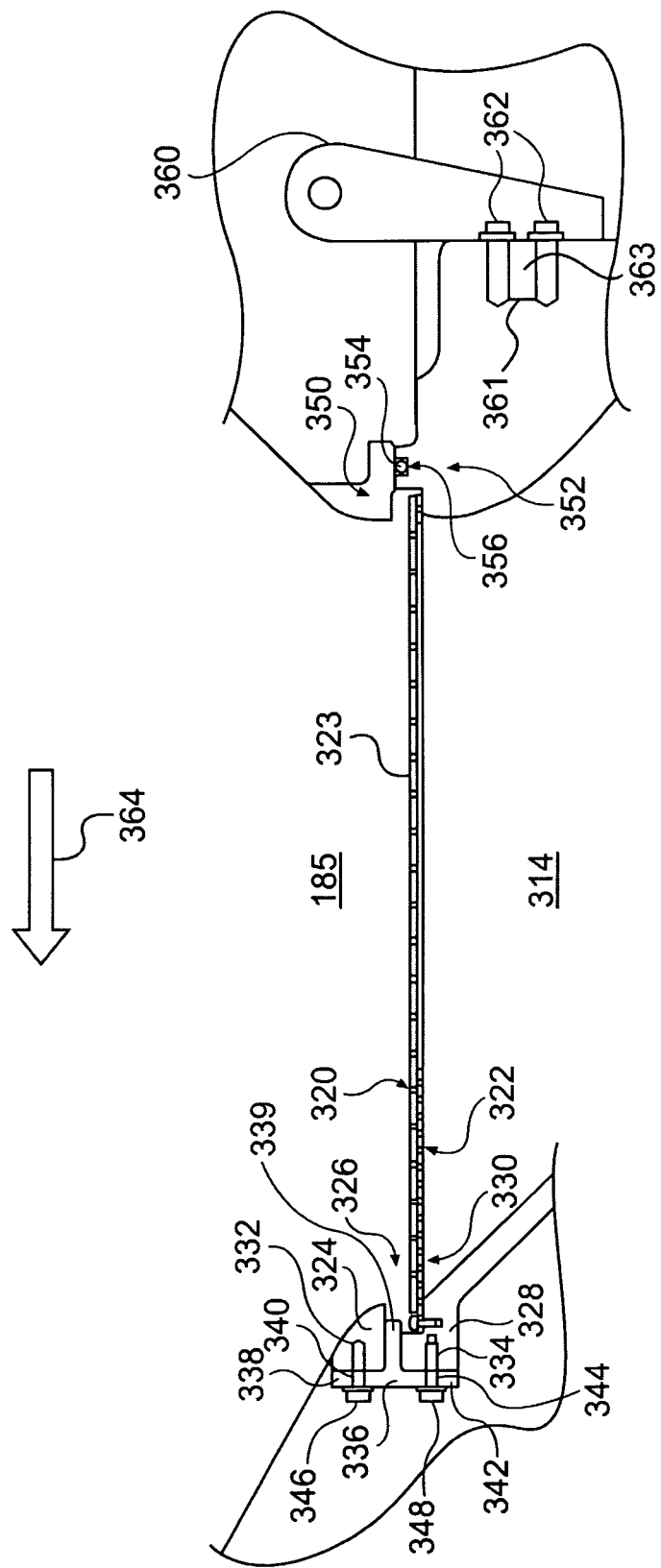
FIG. 14B is a close-up view of a connection between intake ducting and a compressor of the power system shown in FIG. 14A.
Figure 14C:
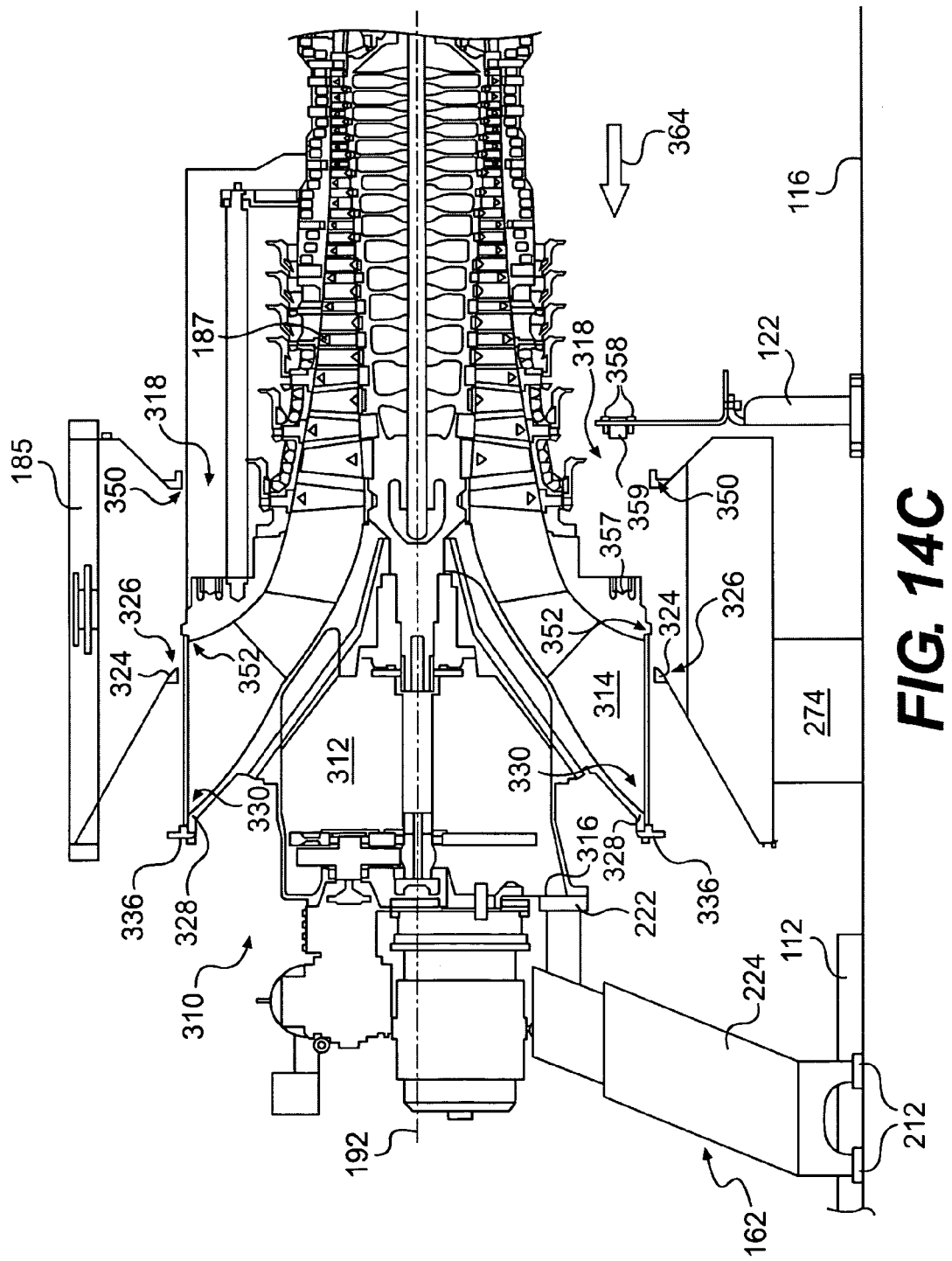
FIG. 14C is a partial cross-sectional, side view of the power system shown in FIG. 14A in a different state than shown in FIG. 14A.

FIGS. 14A-14C show cross-sectional, side views of portions of gas turbine engine 182, including intake ducting 185 and a portion of compressor 187. As shown in FIG. 14A, air inlet housing 314 of compressor 187 may be at least partially positioned within a central passage 318 of intake ducting 185 in a first position (e.g., an operational position of air inlet housing 314 and gas turbine engine 182). Central passage 318 of intake ducting 185 may include an interior diameter 320. Further, compressor 187 may include an exterior diameter 322. Interior diameter 320 of intake ducting 185 may be slightly larger than exterior diameter 322 of compressor 187. Therefore, in the first position, air inlet housing 314 may be positioned at least partially within and intake ducting 185.

As best shown in FIG. 14B, a screen 323 may be positioned between intake ducting 185 and compressor 187. It is contemplated that screen 323 may be attached to either intake ducting 185 or air inlet housing 314 of compressor 187. In an exemplary embodiment, screen 323 may be an annular mesh screen configured to block debris from entering compressor 187. Alternatively, screen 323 may be any type of screen to block debris from entering compressor 187.

Intake ducting 185 may include an annular connection structure 324 at a forward end portion 326 of intake ducting 185 proximate central passage 318. Likewise, air inlet housing 314 of compressor 187 may include an annular connection structure 328 at a forward end portion 330 of air inlet housing 314. Annular connection structure 324 and annular connection structure 328 may interface with one another so that they form part of the interface between intake ducting 185 and inlet housing 314 of compressor 187 when gas turbine engine 180 is assembled and operating. Annular connection structure 324 and annular connection structure 328 may have shapes such that, absent obstructions from other components, annular connection structure 328 may pass through and beyond annular connection structure 324 in forward direction 364. For example, annular connection structure 324 may have a smaller diameter than annular connection structure 328. Annular connection structure 324 may include a plurality of fastening holes 332, for example, circumferentially arranged proximate to central passage 318. Annular connection structure 328 may include a plurality of fastening holes 334, for example, circumferentially arranged in a similar pattern as the plurality of fastening holes 332. Intake ducting 185 may fasten to air inlet housing 314 at annular connection structure 324 and annular connection structure 328 via an annular ring 336.

As best shown in FIG. 14B, annular ring 336 may be include an outer flange 338 including a plurality of fastening holes 340 and an inner flange 342 including a plurality of fastening holes 344. Outer flange 338 and inner flange 342 may each extend in a direction substantially radial relative to longitudinal axis 192. It is contemplated that fastening holes 340 of annular ring 336 may substantially align with fastening holes 332. Further, it is contemplated that fastening holes 344 of annular ring 336 may substantially align with fastening holes 334. A plurality of fasteners 346 may pass through fastening holes 340 of annular ring 336 into fastening holes 332 to secure annular ring 336 to intake ducting 185. Further, a plurality of fasteners 348 may pass through fastening holes 340 of annular ring 336 into fastening holes 334 to secure annular ring 336 to air inlet housing 314. Thus, annular ring 336 may secure intake ducting 185 to air inlet housing 314 at annular connection structure 324 and annular connection structure 328. Further, each fastening hole 332 and each fastening hole 334 may include, for example, a threaded inner wall for threadably receiving fasteners 346 and fasteners 348, respectively. As shown in FIG. 14B, annular ring 336 may have a T-shaped cross section with an annular rib 339 extending at an angle, such as substantially perpendicularly, to outer flange 338 and inner flange 342. With annular ring 336 installed to gas turbine engine 180 during operation, annular rib 339 may sit between annular connection structure 324 and annular connection structure 328. Annular rib 339 may increase the structural rigidity of annular ring 336. It is completed that other cross-sectional shapes of annular ring 336 sufficient to secure intake ducting 185 to air inlet housing 314 may be implemented, including cross-sections that omit annular rib 339.

Fasteners 346 and 348 may be similar type fasteners, each including, for example, twenty-four bolts that may be substantially evenly spaced around annular ring 336 for receipt into fastening holes 332 and fastening holes 334, respectively. However, any number or type of fasteners 346, 348 suitable for removably securing intake ducting 185 and air inlet housing 314 to each other via annular ring 336 may be implemented.

Intake ducting 185 may include an aft end portion 350 proximate central passage 318, and air inlet housing 314 may include an aft end portion 352. As shown in FIG. 14B, it is contemplated that a seal 354 may be positioned between aft end portion 350 and aft end portion 352. For example, seal 354 may be an annular seal housed at least partially within an annular recess 356 of aft end portion 352 of air inlet housing 314.

As shown in FIG. 14A, as well as FIGS. 7B, 7C, and 7F, compressor 187 may be supported on base/support 116 in the first operational position by engine support 122. Air inlet housing 314 of compressor 187 may include an engine support connection 357 for receiving one or more engagement elements associated with engine support 122 to help secure and/or align compressor 187 to base/support 116. The engagement elements of engine support 122 may include one or more fasteners 358 and/or a lug 359. For example, engine support connection 357 may include threaded inner surfaces for mating with fasteners 358 to secure engine support 122 to compressor 187. Additionally, engine support connection 357 may include a pocket sized to receive lug 359 to help align engine support 122 relative to compressor 187. During maintenance or repair operations, it is contemplated that engine support 122 may be disconnected from compressor 187 in order to permit at least a portion of gas turbine engine 182 to move relative to base/support 116.

Additionally, as best shown in FIG. 14B, air inlet housing 314 of compressor 187 may include an engine lifting connection 361 for receiving one or more engagement elements associated with a lifting bracket 360. The engagement elements of lifting bracket 360 may include one or more fasteners 362 and/or a lug 363 to secure lifting bracket 360 to compressor 187. For example, engine lifting connection 361 may include threaded inner surfaces for mating with fasteners 362 to secure lifting bracket 360 to compressor 187. Additionally, engine lifting connection 361 may include a pocket sized to receive lug 363 to help align lifting bracket 360 relative to compressor 187. During maintenance or repair operations, it is contemplated that at least a portion of gas turbine engine 182 may be lifted, for example, by a hoist at lifting bracket 360.

Power system 180 is not limited to the configurations shown in the figures. For example, engine supports 120, 122 may engage different portions of gas turbine engine 182 than power-turbine section 188 and compressor 187, respectively. Additionally, engine supports 120, 122, as well as moveable supports 162, 164, may have a different configuration than shown in the figures. Similarly, one or more of guide tracks 112, 114, 204, 205, 208, 210 may have different configurations than discussed above and shown in the figures. Additionally, support system 110 may include different configurations of sliders 212 or means other than sliders 212 for slideably supporting gas turbine engine 182 and/or portions thereof from guide tracks 112, 114, 204, 205, 208, 210. Additionally, in some embodiments, one or more of the guide tracks 112, 114, 204, 205, 208, 210 and the components that engage them may have a different configuration than others of the guide tracks 112, 114, 204, 205, 208, 210 and the components that engage them. Furthermore, support system 110 may have various other components in addition to the ones shown in the figures, and/or support system 110 may omit one or more of the components shown in the figures. For example, support system 110 may include various other stationary and/or moveable supports, as well as other guide tracks, for supporting various portions of gas turbine engine 182. Moreover, while the figures do not show any components drivingly connected to the output of power-turbine section 188, power system 180 may include various components driven by power-turbine section 188. For example, like power system 80, power system 180 may include a power-transfer unit 12 and power load 14 drivingly connected to the output of power-turbine section 188.

INDUSTRIAL APPLICABILITY

Power system 80 and support system 10 thereof, as well as power system 180 and support system 110 thereof, may have application wherever power is required for performing one or more tasks. Gas turbine engine 82 may be operated to drive input shaft 76 of power-transfer unit 12 and, thereby, drive power load 14 to pump fluid, generate electricity, or do other work. While gas turbine engine 82 is driving power load 14, support 30 and support 32 may be fastened in substantially fixed positions with respect to one another and fixedly fastened to base/support 16 to hold the various portions of gas turbine engine 82 in substantially fixed positions with respect to base/support 16. Similarly, gas turbine engine 182 may be operated to drive various power loads (not shown) drivingly connected to the output of power-turbine section 188. During such operation of gas turbine engine 182, as FIGS. 7A-7F show, gas turbine engine 182 may be supported in a substantially fixed position relative to base/support 116 by engine supports 120, 122 without support from guide tracks 112, 114, 204, 205, 208, 210.

Figure 3A:
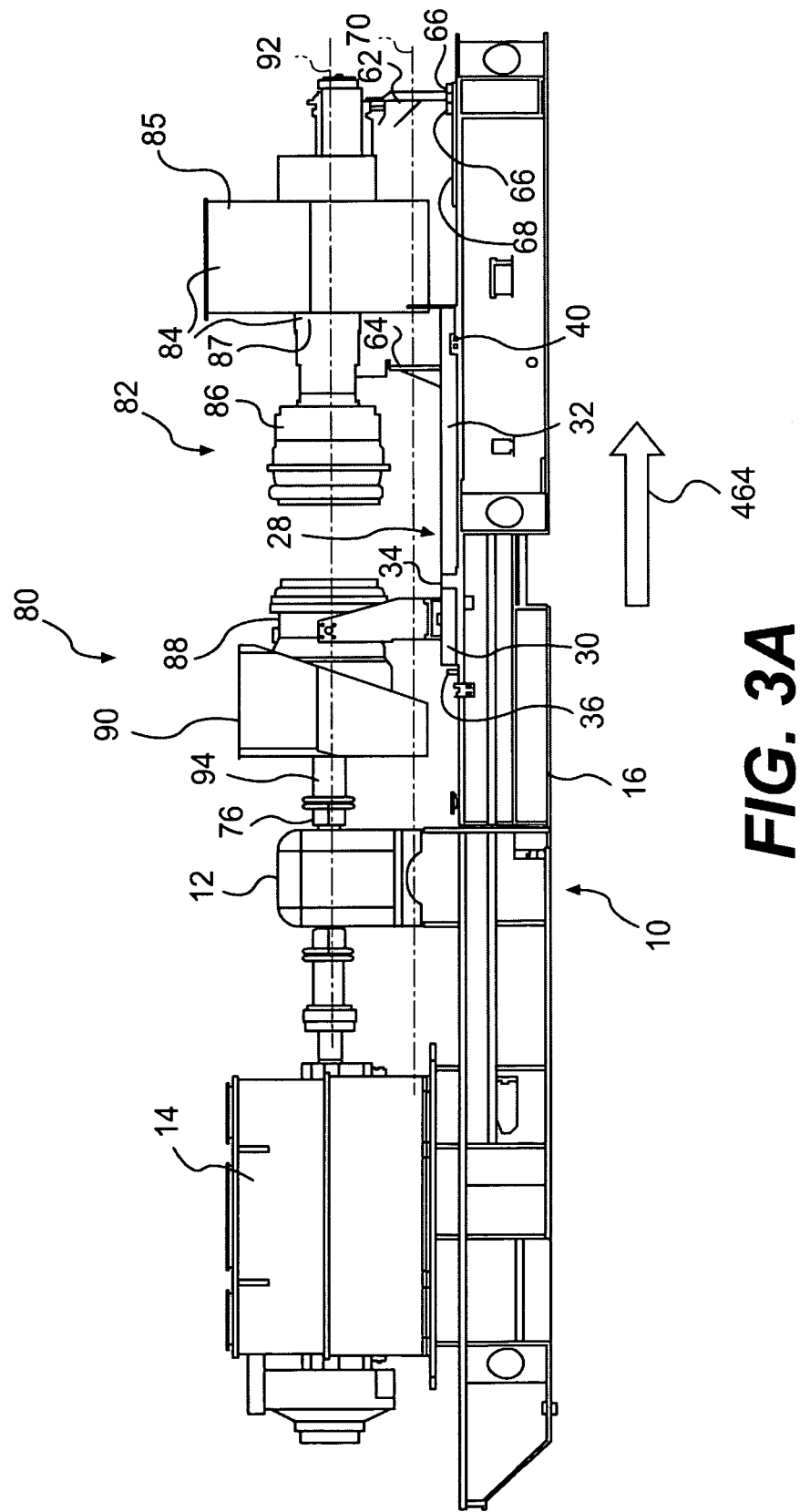
FIG. 3A is a side view of the power system shown in FIG. 2A, wherein the power system is in another state.

When gas turbine engine 82 is not being operated to drive power load 14, support system 10 may be used to support various portions of gas turbine engine 82 while they are moved for various purposes, such as repair. For example, as FIG. 3A shows, moveable supports 62, 64 may be used to support compressor 87 and combustor 86 while compressor 87 and combustor 86 are moved along longitudinal axis 92 away from power-turbine section 88 and exhaust collector 90. In order to allow this, moveable supports 62, 64 may first be engaged to compressor 87 in a manner such that they may fully support compressor 87 and combustor 86. Subsequently, any connections between compressor 87 and support 32 may be released, and combustor 86 may be unfastened from power-turbine section 88. Additionally, compressor 87 may be disconnected from intake ducting 85 to allow compressor 87 to move along longitudinal axis 92 through intake ducting 85, while intake ducting 85 remains stationary. For example, in some embodiments, annular rings (not shown) connected between an outer surface of compressor 87 and intake ducting 85 may be removed so that compressor 87 may move through a center portion of intake ducting 85.

Subsequently, moveable supports 62, 64 may be slid along axis 70 on guide tracks 68, 74 to move compressor 87 and combustor 86 along longitudinal axis 92 away from power-turbine section 88. Once gas producer 84 and combustor 86 are at a desired position along longitudinal axis 92, the positions of moveable supports 62, 64 may be secured to secure the position of gas producer 84 and combustor 86.

Figure 3B:
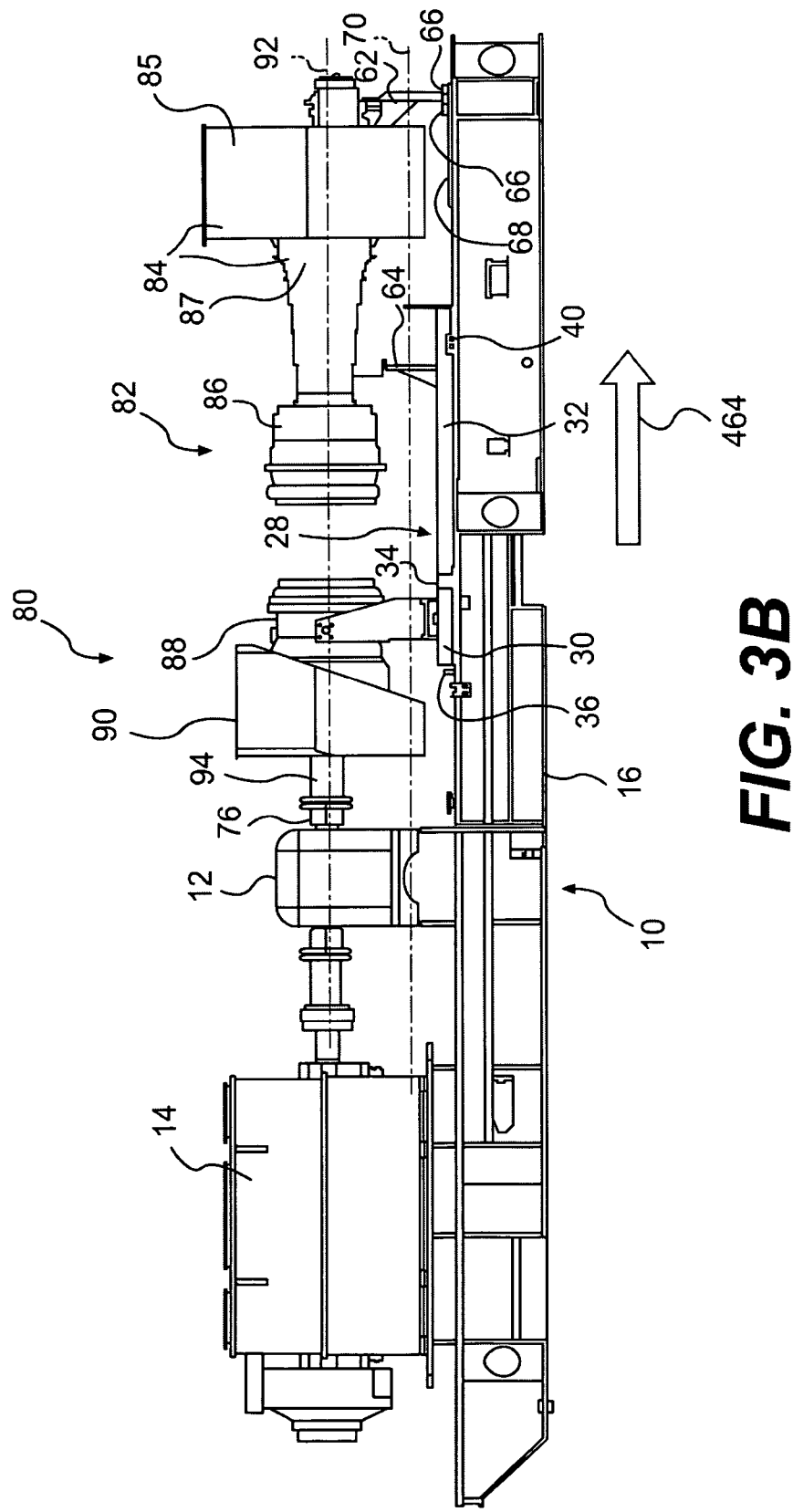
FIG. 3B is a side view of the power system shown in FIG. 3A, wherein the power system is in another state.

As FIG. 3B shows, intake ducting 85 may be left connected to compressor 87 and moved with compressor 87 and combustor 86 along longitudinal axis 92 while moveable supports 62, 64 support compressor 87, intake ducting 85, and combustor 86. This may entail unfastening any connections fixing intake ducting 85 to support 32, other ductwork (not shown), and/or other components before sliding moveable supports 62, 64 along axis 70.

Figure 4A:
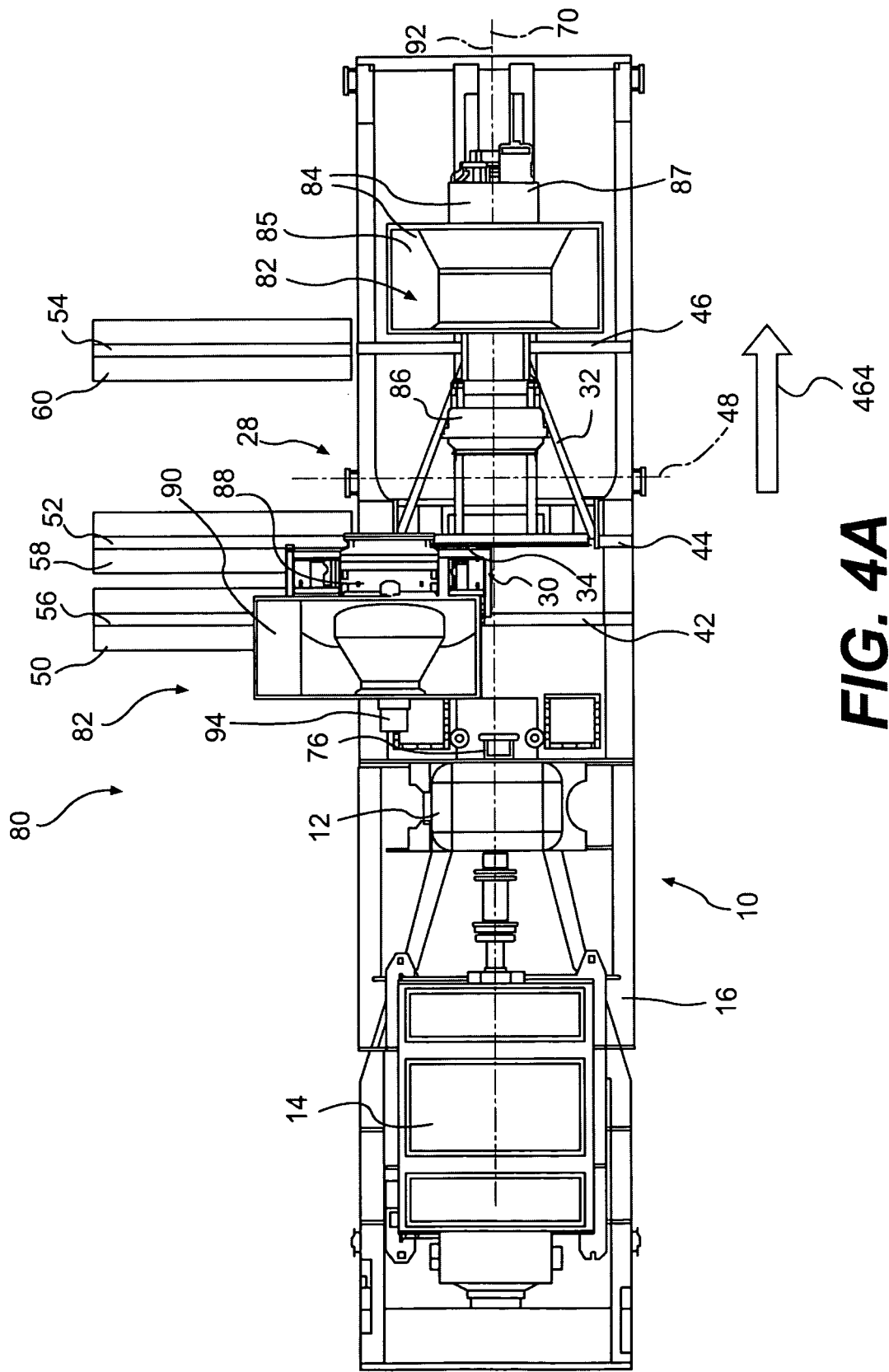
FIG. 4A is a plan view of the power system shown in FIG. 2A, wherein the power system is in another state.
Figure 4B:
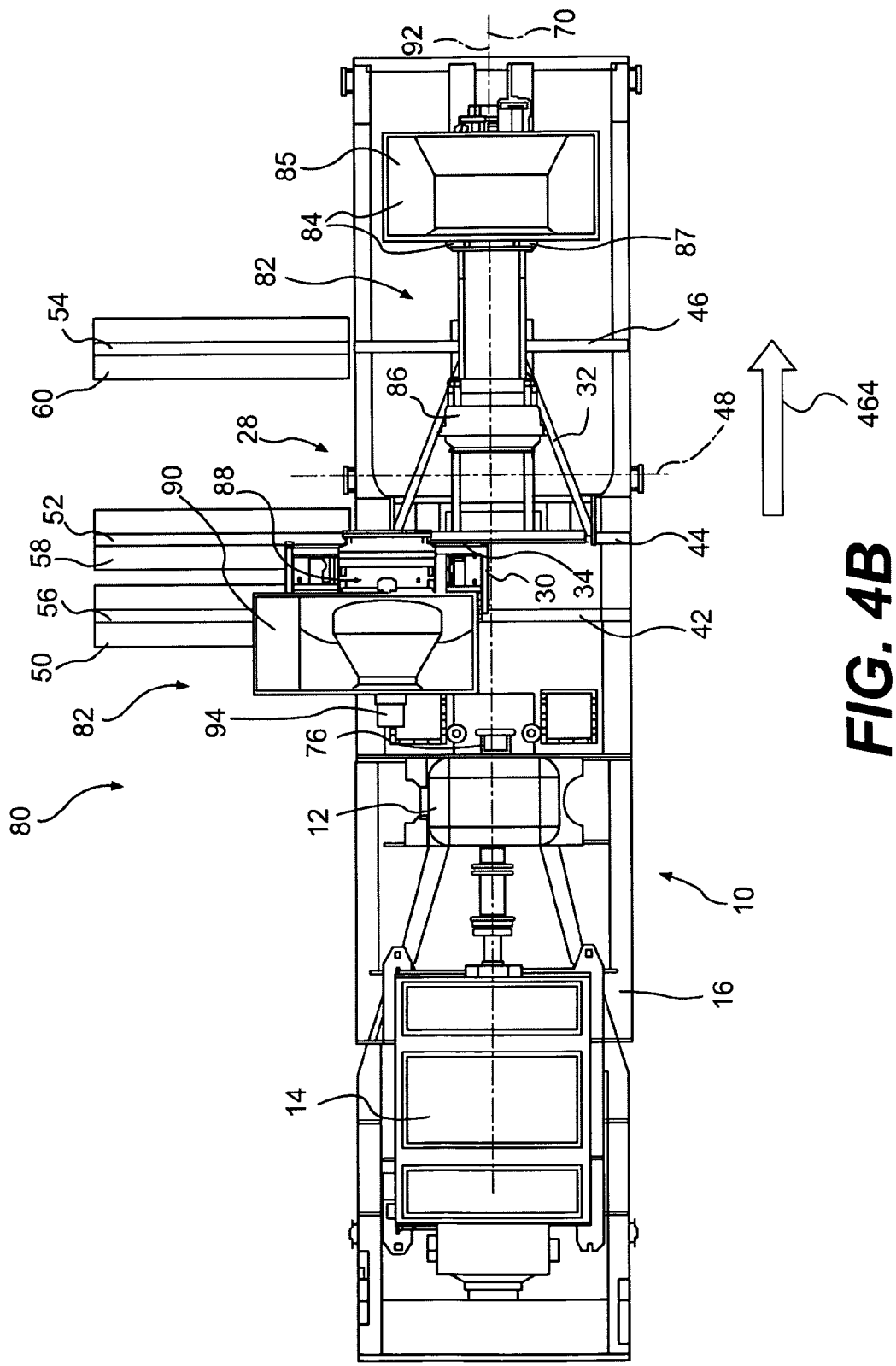
FIG. 4B is a plan view of the power system shown in FIG. 2A, wherein the power system is in another state.

Additionally, as FIGS. 4A and 4B show, support 30 may be used to support power-turbine section 88 and exhaust collector 90 while they are moved away from longitudinal axis 92 independently of gas producer 84 and combustor 86. In order to allow this, output shaft 94 of gas turbine engine 82 may be disconnected from input shaft 76 of power-transfer unit 12. Additionally, any engagements fixing the position of support 30 with respect to support 32 and base/support 16 may be released. Subsequently, support 30 may be slid on guide tracks 42, 44 to move power-turbine section 88 and exhaust collector 90 away from longitudinal axis 92. In some embodiments, such as the embodiment shown in FIGS. 4A and 4B, support 30 may fully support power-turbine section 88 and exhaust collector 90 as they are moved away from longitudinal axis 92. As support 30 is moved along axis 48, support 30 may begin to move off of guide tracks 42, 44 onto guide tracks 56, 58 of portable supports 50, 52. Once power-turbine section 88 and exhaust collector 90 are in a desired position along axis 48, various provisions may be used to fix the position of support 30, power-turbine section 88, and exhaust collector 90 along axis 48.

Figure 5:
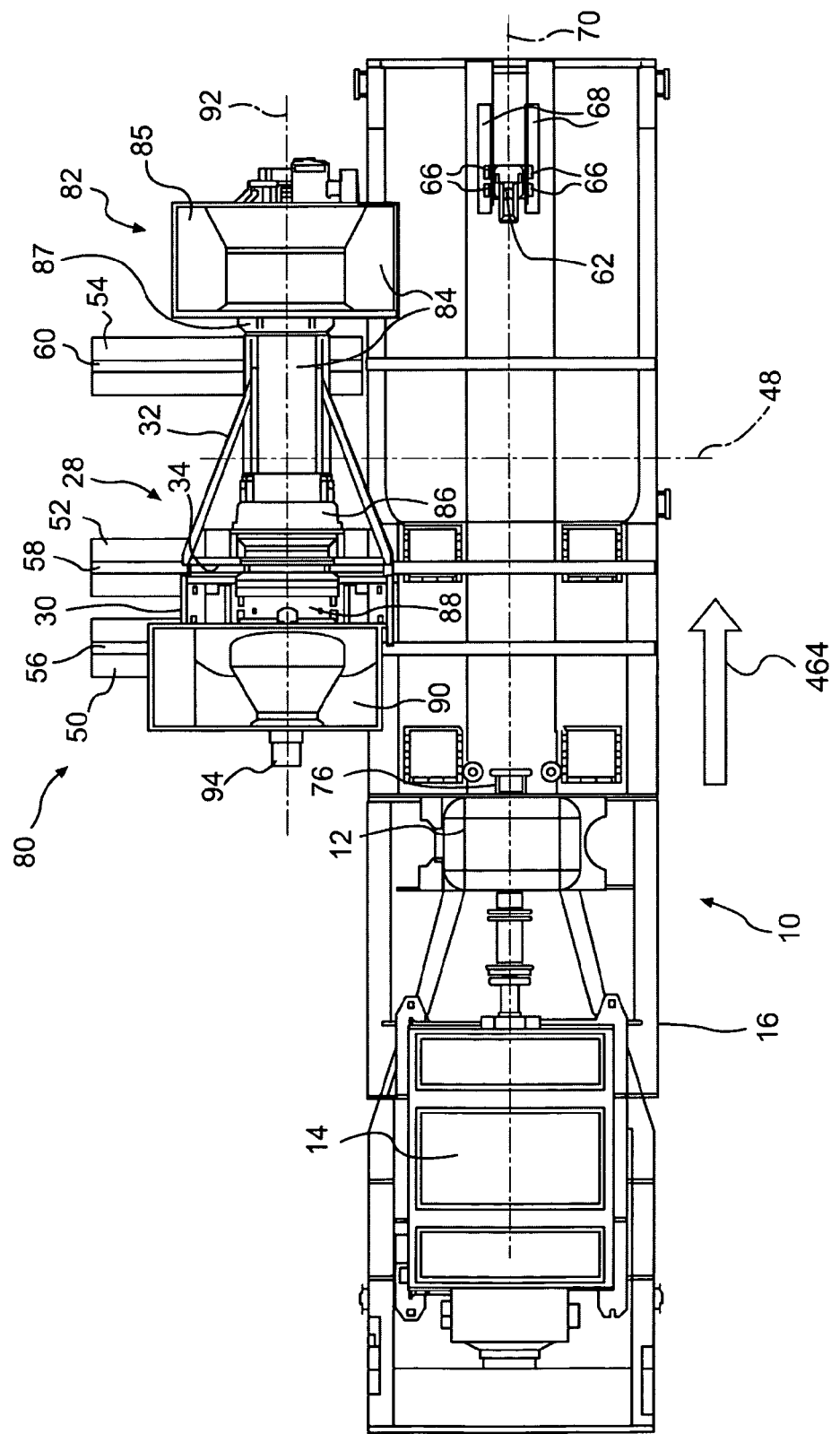
FIG. 5 is a plan view of the power system shown in FIG. 2A, wherein the power system is in another state.

As FIG. 5 shows, support system 10 may also be used to support gas turbine engine 82 as a unit as it is moved along axis 48. In order to allow this, supports 30, 32 may be left fixedly fastened to one another, output shaft 94 of gas turbine engine 82 may be disconnected from input shaft 76 of power-transfer unit 12, and any engagements fixing the position of frame 28 with respect to base/support 16 may be released. Frame 28 may then be slid along guide tracks 42, 44, 46. As frame 28 moves along axis 48, it may begin to move off of base/support 16 onto portable supports 50, 52, 54.

Like support system 10, support system 110 may be used when gas turbine engine 182 is not running to support one or more portions of gas turbine engine 182 while they are moved relative to base/support 116. For example, guide tracks 112, 114 and moveable supports 162, 164 may be used to support compressor 187 and combustor 186 while they are moved independently of power-turbine section 188. In preparation for doing so, as FIG. 8B shows, moveable support 162 may be mounted to guide tracks 112 and connected to compressor 187 in a manner allowing moveable support 162 to support compressor 187 from guide tracks 112. For example, removable pipe 317 may be removed from pipe connection 316 at forward end portion 310 of compressor 187; then, flange 222 of moveable support 162 may be fastened to pipe connection 316 (shown in FIG. 9) via one or more fasteners (not shown). For example, flange 222 may be fastened to a mating radially extending annular flange of pipe connection 316 by bolting the flanges together with bolts secured through holes in flange 222 and the mating flange of pipe connection 316. Additionally, moveable support 164 may be assembled using lower portion 224, and moveable support 164 may then be mounted to guide tracks 114 and attached to combustor 186 in a manner allowing moveable support 164 to suspend combustor 186 from guide tracks 114.

Once moveable supports 162, 164 are engaged to gas turbine engine 182 and guide tracks 112, 114 in this manner, various engagements attaching compressor 187 and combustor 186 to other components of power system 180 may be released. The engagements between compressor 187 and engine support 122, as well as the engagements between combustor 186 and power-turbine section 188 may be released. If it is desired to leave intake ducting 185 stationary while moving compressor 187 and combustor 186, support 274 may be put in place to support intake ducting 185, and the engagements between intake ducting 185 and compressor 187 may be released. As shown in FIG. 14C, an operator may disconnect intake ducting 185 from air inlet housing 314 of compressor 187 by removing each fastener 346 from fastening holes 332. It is contemplated that annular ring 336 may remain fastened to air inlet housing 314 of compressor 187 via fasteners 348. It is also contemplated that lifting bracket 360 may be removed from air inlet housing 314 to provide sufficient clearance for compressor 187 to pass through central passage 318. Further, any other mechanical, electrical, or hydraulic connections or lines may be disconnected from gas turbine engine 182. For example, fuel supply lines, oil supply lines, oil drain lines, bleed air pipes, and electrical connections may be removed to allow movement of one or more sections of gas turbine engine 182.

Figure 9:
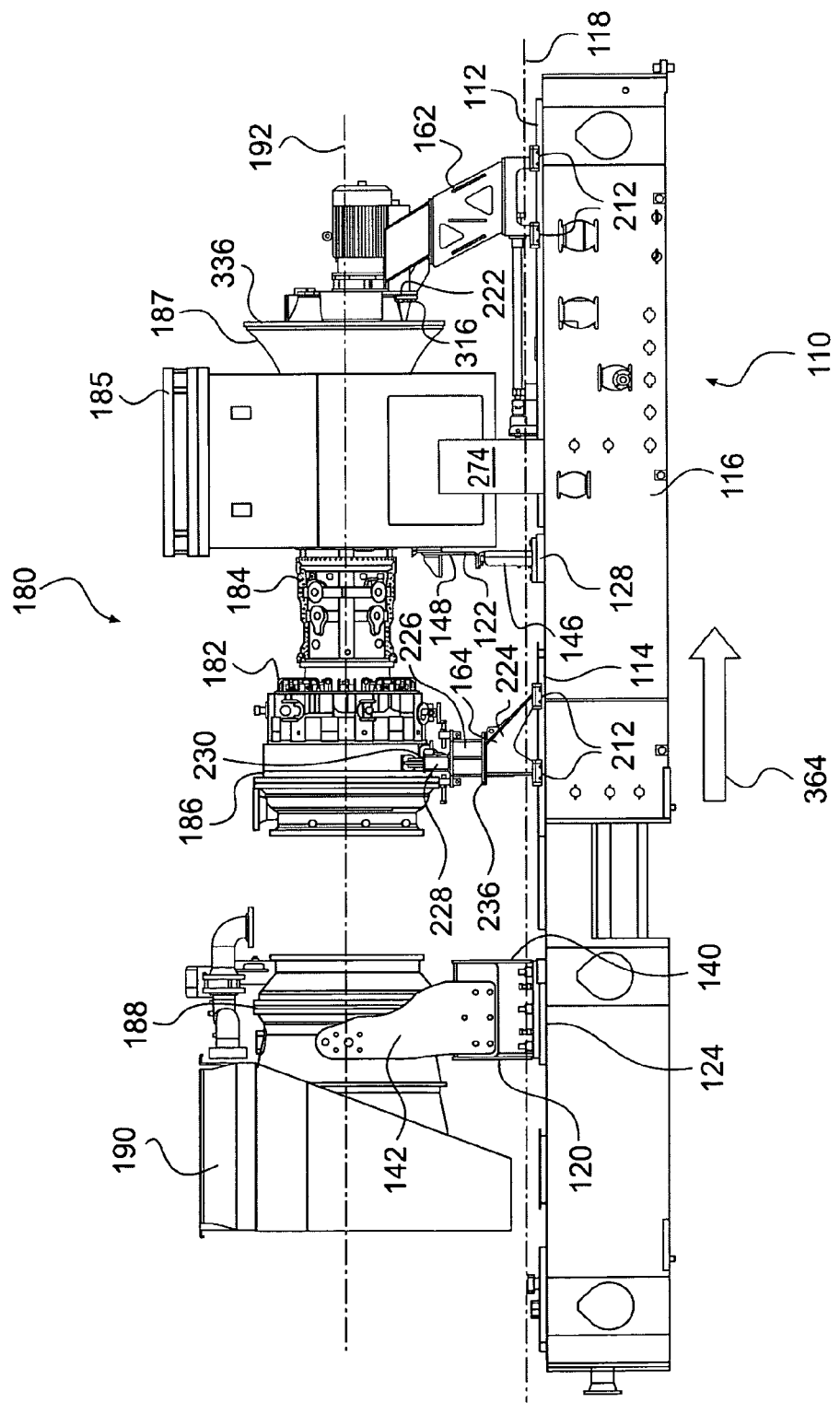
FIG. 9 is an elevational view of the power system shown in FIG. 7A in another state.

As shown in FIG. 14C, once all engagements limiting movement of compressor 187 and combustor 186 away from power-turbine section 188 have been released and moveable supports 162, 164 are supporting compressor 187 and combustor 186 from guide tracks 112, 114, compressor 187, combustor 186, and moveable supports 162, 164 may be slid away from power-turbine section 188 in forward direction 364 substantially along longitudinal axis 192 on guide tracks 112, 114. FIGS. 9 and 14C show compressor 187, combustor 186, and moveable supports 162, 164 after being slid away from power-turbine section 188. As can be seen by comparing FIG. 9 to FIG. 8B and by comparing FIG. 14C to FIG. 14A, with compressor 187 disconnected from intake ducting 185 during this process, compressor 187 may slide through central passage 318 of intake ducting 185. During this process, the shapes of annular connection structures 324 and 328 of compressor 187 and intake ducting 185, respectively, may allow annular connection structure 328 to pass through and beyond annular connection structure 324 in forward direction 364. Similarly, the shapes of compressor 187 and intake ducting 185 may allow moving compressor 187 in forward direction to a position where auxiliary gear box 312 extends at least partially forward of forward end portion 326 of intake ducting 185.

In addition to allowing movement of compressor 187 and auxiliary gear box 312 in forward direction 364 from the operational position shown in FIG. 14A, the shapes of compressor 187, annular connection structure 328 thereof, intake ducting 185, and annular connection structure 324 may allow movement of compressor 187 and auxiliary gear box 312 in forward direction 364 into the operational position shown in FIG. 14A. In other words, during assembly of gas turbine engine 182, compressor 187, and auxiliary gear box 312 may be moved in forward direction 364 within central passage 318 from a position where compressor 187 and auxiliary gear box 312 are disposed on an aft side of annular connection structure 324 to the operational position shown in FIG. 14A where annular connection structure 328 is aligned with annular connection structure 324 and auxiliary gear box 312 is disposed on the forward side of annular connection structure 324. As discussed above, from this position, compressor 187 and auxiliary gear box 312 may be moved in forward direction 364, to the position shown in FIG. 14C where annular connection structure 328 and auxiliary gear box 312 are disposed forward of annular connection structure 324, which is disposed between annular connection structure 328 and the aft end of compressor 187. Thus, compressor 187 and intake ducting 185 may have shapes such that compressor 187 may be moved in forward direction 364 from a position where gear box 312 is disposed aft of annular connection structure 324, to a position where compressor 187 is forward of annular connection structure 324 and annular connection structure 328 is aligned with annular connection structure 324, to a position where auxiliary gear box 312 and annular connection structure 328 are disposed forward of annular connection structure 324.

Additionally, moveable support 162 may also be used to move auxiliary gear box 312 by itself. To do so, moveable support 162 may be fastened to pipe connection 316 as discussed above, followed by unfastening auxiliary gear box 312 from the other portions of compressor 187. Once auxiliary gear box 312 is unfastened from the rest of compressor 187, moveable support 162 may support auxiliary gear box 312 while it is slid in forward direction 364 away from the rest of compressor 187. During such an operation, portions of compressor 187 may remain supported by engine support 122.

Support system 110 may also be used to support gas producer 184 and combustor 186 while they are moved independently of power-turbine section 188 in a direction other than along longitudinal axis 192. For example, referring to FIGS. 10A-10D, guide tracks 205, 208, 210 may be used to support gas producer 184 and combustor 186 while they are moved in the direction of an axis 276 that extends at an angle to longitudinal axis 192 of gas turbine engine 182. The angle between axis 276 and longitudinal axis 192 may have various values. In some embodiments, axis 276 may extend substantially perpendicular to longitudinal axis 192 of gas turbine engine 182.

Before gas producer 184 and combustor 186 may be moved in the direction of axis 276 on guide tracks 205, 208, 210, some preparatory steps may be required. If support 246 and guide tracks 205, 208, 210 are not already in place, they may be set up as shown in FIGS. 10A and 10B. Support 246 may be set in place adjacent base/support 116 using various means. For example, in embodiments where support system 110 includes transport wheels for support 246, support 246 may be rolled into place using those transport wheels. Support 246 may be positioned such that support structures 252, 256, 260 are substantially aligned with support structures 124, 126, 128, respectively, in the directions of axes 118, 192. Once support 246 is so positioned, the weight of support 246 may be released onto legs 250, so that legs 250 may hold support 246 stationary adjacent base/support 116. In embodiments where transport wheels are used to roll support 246 into place adjacent base/support 116, releasing the weight of support 246 onto legs 250 may involve removing or raising those wheels.

Support 246 may be set up such that the top surface of frame 248 is substantially even with the top surface of base/support 116. In some embodiments, legs 250 may have a fixed length that automatically puts the top surface of frame 248 substantially even with the top surface of base/support 116. In other embodiments, the elevation of one or more portions of frame 248 may be adjusted, such as by using one or more jacking mechanisms to raise or lower one or more of legs 250 and/or by placing spacers under one or more of legs 250. In some embodiments, once support 246 is in the desired position relative to base/support 116, support 246 may be anchored to base/support 116 to help stabilize support 246.

With support 246 in place adjacent base/support 116, guide tracks 205, 208, 210 and their support beams 240, 242, 244 may be mounted across base/support 116 and frame 248 of support 246. As FIGS. 10A and 10B show, guide tracks 205, 208, 210 may be mounted such that they each extend substantially parallel to axis 276. Guide track 205 and its support beam 240 may be mounted generally under combustor 186 of gas turbine engine 182 and adjacent support structure 264 on frame 248. Similarly, guide track 208 and its support beam 242 may be mounted generally under combustor 186 and on a side of support structure 264 opposite guide track 205 and its support beam 240. As best shown in FIG. 10A, guide track 208 and its support beam 242 may be mounted across guide tracks 114, with guide tracks 114 extending through apertures 245 in support beam 242. Guide track 210 and its support beam 244 may be mounted adjacent support structure 128 on base/support 116 and adjacent support structure 260 on frame 248. Guide tracks 205, 208, 210 and their support beams 240, 242, 244 may be secured to base/support 116 and frame 248 in various manners. In some embodiments, fasteners may be used to secure guide tracks 205, 208, 210 to base/support 116 and frame 248.

Once support 246 is in place and guide tracks 205, 208, 210 are mounted across base/support 116 and frame 248 of support 246, the weight of gas producer 184 and combustor 186 of gas turbine engine 182 may be transferred to guide tracks 205, 208, 210 as follows. Sliders 212 (shown in FIGS. 10C and 10D) may be engaged to guide tracks 205, 208, 210. Additionally, as FIGS. 10B and 10C show, moveable support 164 may be assembled using lower portion 225. Lower portion 225 may be secured to the sliders 212 engaged to guide tracks 205, 208, such that moveable support 164 is suspended from guide tracks 205, 208 by those sliders 212. Upper portion 228 (i.e., uprights 229, 230) may be engaged to combustor 186. With moveable support 164 suspended from guide tracks 205, 208 by sliders 212 and upper portion 228 of moveable support 164 engaged to combustor 186, sliders 212 and moveable support 164 may suspend combustor 186 from guide tracks 205, 208. The above-described steps for engaging sliders 212 and moveable support 164 between guide tracks 205, 208 and combustor 186 may be executed in various orders.

In order to suspend gas producer 184 from guide track 210, as FIG. 10D shows, moveable support 271 may be assembled between guide track 210 and gas producer 184. This may involve engaging sliders 212 to guide track 210. Additionally, the fasteners 196 clamping lower portion 146 of engine support 122 to support structure 128 (shown in FIG. 7F) may be loosened slightly, and jacking bolts 198 may be used to lift engine support 122 and gas producer 184 slightly relative to support structure 128. Then, as FIG. 10D shows, bracket 270 may be secured to the sliders 212 on guide track 210, and bracket 268 may be secured between bracket 270 and upper portion 148 of engine support 122 to form moveable support 271.

Once brackets 268, 270 are connected between upper portion 148 of engine support 122 and the sliders 212 on guide track 210, jacking bolts 198 (shown in FIG. 7F) may be used to lower engine support 122 and gas producer 184. Brackets 268, 270 may have a shape and size such that the vertical slack in the load path from upper portion 148 of engine support 122, through brackets 268, 270 and sliders 212, to guide track 210 is less than the vertical slack between lower portion 146 of engine support 122 and support structure 128. Accordingly, when jacking bolts 198 are used to lower gas producer 184, sliders 212 and brackets 268, 270 may be compressed between upper portion 148 of engine support 122 and guide track 210 before lower portion 146 of engine support 122 comes back down to support structure 128. Thus, the weight of gas producer 184 may be transferred to guide track 210 through upper portion 148 of engine support 122, brackets 268, 270, and sliders 212. With these components supporting gas producer 184 from guide track 210, lower portion 146 of engine support 122 may be removed.

Subsequently, with moveable supports 164, 271 engaged to combustor 186, gas producer 184, and guide tracks 205, 208, 210 in the manner shown in FIG. 10B, various engagements attaching gas producer 184 and combustor 186 to other components of power system 180 may be released. For example, engagements between intake ducting 185 and external ductwork (not shown), engagements between combustor 186 and power-turbine section 188, and various other engagements may be released.

In some embodiments, releasing the engagements connecting gas producer 184 and combustor 186 to other components of power system 180 may suffice to allow moving gas producer 184 and combustor 186 along guide tracks 205, 208, 210 in the direction of axis 276. In other embodiments, one or more components of gas producer 184 and/or combustor 186 may overlap with one or more components of power-turbine section 188 in a manner obstructing movement of gas producer 184 and combustor 186 in the direction of axis 276. In such embodiments, this may be addressed with the above-discussed provisions for (1) supporting combustor 186 with uprights 229, 230 of moveable support 164 while sliding combustor 186 and uprights 229, 230 in the direction of longitudinal axis 192 relative to middle portion 226 of moveable support 164; and (2) supporting gas producer 184 with upper portion 148 of engine support 122 and bracket 268 while sliding gas producer 184, upper portion 148 of engine support 122, and bracket 268 in the direction of longitudinal axis 192 relative to bracket 270. Specifically, using these provisions, combustor 186, uprights 229, 230, gas producer 184, upper portion 148 of engine support 122, and bracket 268 may all be slid simultaneously along longitudinal axis 192 relative to middle portion 226 of moveable support 164 and bracket 270 of moveable support 271 to move combustor 186 and gas producer 184 away from power-turbine section 188.

Subsequently, with the constraints imposed by engagements to other components and component overlap removed, gas producer 184, combustor 186, and moveable supports 164, 271 may be slid as a unit in the direction of axis 276 and away from longitudinal axis 192 on guide tracks 205, 208, 210. FIG. 11 shows gas producer 184, combustor 186, and moveable supports 164, 271 after having been moved in this manner on guide tracks 205, 208, 210. Moving gas producer 184 and combustor 186 away from longitudinal axis 192 of gas turbine engine 182 may allow better access to internal components of combustor 186 and power-turbine section 188 for maintenance and repair operations.

Additionally, gas producer 184 and combustor 186 may be transferred from base/support 116 to frame 248 of support 246. To do so, gas producer 184, combustor 186, and moveable supports 164, 271 may be slid on guide tracks 205, 208, 210 until lower portion 225 of moveable support 164 is substantially aligned with support structure 264 on frame 248 and moveable support 271 is substantially aligned with support structure 260 on frame 248. Subsequently, lower portion 225 of moveable support 164 may be secured to support structure 264 and released from the sliders 212 engaged to guide tracks 205, 208, thereby securely fixing combustor 186 to frame 248. This may be accomplished by lifting the weight of combustor 186 and moveable support 164 off of the sliders 212 engaged to guide tracks 205, 208, releasing the engagements between moveable support 164 and those sliders 212, moving those sliders 212 out of the way, lowering lower portion 225 of moveable support 164 onto support structure 264, and securely fixing lower portion 225 of moveable support 164 to support structure 264.

Similarly, gas producer 184 may be securely fixed to support structure 260 of frame 248 using lower portion 146 and upper portion 148 of engine support 122. To do so, lower portion 146 of engine support 122 may be placed between support structure 260 and upper portion 148 of engine support 122, and then lower portion 146 may be fixedly secured to upper portion 148. This may leave lower portion 146 spaced slightly above support structure 260 with upper portion 148, bracket 268, bracket 270, and sliders 212 still supporting gas producer 184 from guide track 210. Subsequently, jacking bolts 198 (shown in FIG. 7F) may be used with lower portion 146 and upper portion 148 of engine support 122 to lift the weight of gas producer 184 off of bracket 268, bracket 270, and the sliders 212 engaged to guide track 210. This may allow removing brackets 268, 270 from between upper portion 148 of engine support 122 and sliders 212. Subsequently, jacking bolts 198 may be used to drop lower portion 146 of engine support 122 onto support structure 260, and lower portion 146 may be securely fixed to support structure 260, such as with fasteners. Because support structure 260 has substantially the same configuration as support structure 128 of base/support 116, the same mounting features and hardware used to secure lower portion 146 of engine support 122 to support structure 128 may be used to secure lower portion 146 of engine support 122 to support structure 260. Additionally, guide tracks 205, 208, 210 and their support beams 240, 242, 244, as well as any other structures connecting frame 248 of support 246 to base/support 116, may be removed to allow moving frame 248 away from base/support 116.

Support system 110 may also be used to support gas turbine engine 182 while it is moved as a unit relative to base/support 116. For example, referring to FIGS. 12A and 12B, guide tracks 204, 205, 210 may be used to support gas turbine engine 182 as it is moved as a unit in the direction of axis 276. To prepare for this, as discussed in detail above, support 246 may be positioned adjacent base/support 116. Additionally, as FIG. 10A shows, guide track 204 and its support beam 238 may be mounted substantially parallel to axis 276 on base/support 116 adjacent support structures 124, 126 and on frame 248 adjacent support structures 252, 256. Similarly, guide track 205 and its support beam 240 may be mounted substantially parallel to axis 276 across base/support 116 and frame 248 on a side of support structures 124, 126, 252, 256 opposite guide track 204. Additionally, as discussed above, guide track 210 and its support beam 244 may be mounted substantially parallel to axis 276 on base/support 116 adjacent support structure 128 and on frame 248 adjacent support structure 260. As was also discussed above, the weight of gas producer 184 may be transferred from support structure 128 to guide track 210 by assembling moveable support 271 between gas producer 184 and guide track 210 and removing lower portion 146 of engine support 122.

The weight of power-turbine section 188 and exhaust collector 190 may be transferred from support structures 124, 126 of base/support 116 to guide tracks 204, 205 as follows. The fasteners 200 securing engine support 120 to support structures 124, 126 may be loosened slightly. Subsequently, jacking bolts 202 may be used to lift engine support 120, power-turbine section 188, and exhaust collector 190 slightly. Additionally, as FIG. 12B shows, sliders 212 may be engaged to guide tracks 204, 205. Brackets 272 may be securely attached between these sliders 212 and engine support 120 in a manner allowing brackets 272 and the sliders 212 to fully support engine support 120, power-turbine section 188, and exhaust collector 190 from guide tracks 204, 205. Brackets 272 may be attached to the sliders 212 and engine support 120 using various means, including, but not limited to, fasteners (not shown).

Once brackets 272 and the sliders 212 engaged to guide tracks 204, 205 are attached to engine support 120 in this manner, jacking bolts 202 may be used to lower engine support 120, power-turbine section 188, and exhaust collector 190. Brackets 272 and the sliders 212 may be configured and engaged between engine support 120 and guide tracks 204, 205 in a manner such that the vertical slack in the load path from engine support 120, through brackets 272 and sliders 212, to guide tracks 204, 205 is less than the vertical slack between engine support 120 and support structures 124, 126. Accordingly, as jacking bolts 202 are used to lower engine support 120, the vertical load on engine support 120 may be accepted by brackets 272, the sliders 212, and guide tracks 204, 205 before engine support 120 drops back into contact with support structures 124, 126. Assembled in this way between guide tracks 204, 205 and power-turbine section 188, the sliders 212, brackets 272, and engine support 120 may collectively form a moveable support 273 for gas turbine engine 182.

Once gas turbine engine 182 is suspended from guide tracks 204, 205, 210 by moveable supports 271, 273, various engagements between gas turbine engine 182 and other components of power system 180 may be released. For example, the fasteners 200 used to secure engine support 120 to support structures 124, 126 may be removed. Additionally, engagements between intake ducting 185, exhaust collector 190, and external intake and exhaust ducting (not shown) may be released. Similarly, engagements between the output of power-turbine section 188 and any power loads (not shown) connected thereto may be released.

Once gas turbine engine 182 is released from these and other attachments to other portions of power system 180, gas turbine engine 182 and moveable supports 271, 273 may be slid in the direction of axis 276 on guide tracks 204, 205, 210. Gas turbine engine 182 may be moved in this manner for various purposes. For example, gas turbine engine 182 may be moved on guide tracks 204, 205, 210 to transfer gas turbine engine 182 from base/support 116 to frame 248 of support 246. To transfer gas turbine engine 182 to frame 248, gas turbine engine 182 and moveable supports 271, 273 may be slid on guide tracks 204, 205, 210 to a position where (1) moveable support 271 is substantially aligned with support structure 260 on frame 248, and (2) engine support 120 of moveable support 273 is aligned with support structures 252, 256 in substantially the same manner that engine support 120 aligns with support structures 124, 126 of base/support 116 when mounted thereto. With gas turbine engine 182 and moveable supports 271, 273 so positioned over frame 248, the weight of gas producer 184 may be lifted from guide track 210, and gas producer 184 may be secured to support structure 260 using lower portion 146 and upper portion 148 of engine support 122, as discussed in detail above.

Additionally, using a similar process, power-turbine section 188 and exhaust collector 190 may be securely fixed to frame 248 through support structures 252, 256. To do so, the weight of engine support 120, power-turbine section 188, and exhaust collector 190 may be lifted from brackets 272 and the sliders 212 engaged to guide tracks 204, 205. This may be done, for example, using jacking bolts 202. After the load is lifted off of them, brackets 272 may be removed from between engine support 120 and the sliders 212 engaged to guide tracks 204, 205. Subsequently, engine support 120 may be lowered onto support structures 252, 256 and securely fixed thereto. Because support structures 252, 256 have substantially the same configurations as support structures 124, 126 on base/support 116, the same mounting features and hardware used to secure engine support 120 to support structures 124, 126 may be used to secure engine support 120 to support structures 252, 256.

In some cases, to help support gas turbine engine 182 from frame 248, additional supports may be connected between frame 248 and gas turbine engine 182. For example, moveable support 164 may be mounted between support structure 264 and combustor 186 to help support gas turbine engine 182 from frame 248.

Support system 110 may also be used to support power-turbine section 188 and exhaust collector 190 while they are moved parallel to axis 276 independently of gas producer 184 and combustor 186. This process may involve, for example, (1) releasing engagements between power-turbine section 188 and combustor 186; (2) releasing engagements between exhaust collector 190 and other portions of power system 180; (3) transferring the weight of power-turbine section 188 and exhaust collector 190 to guide tracks 204, 205 by assembling moveable support 273 between guide tracks 204, 205 and power-turbine section 188 using the process discussed above; and (4) sliding power-turbine section 188 exhaust collector 190, and moveable support 273 parallel to axis 276 on guide tracks 204, 205. Using this process, power-turbine section 188 and exhaust collector 190 may be transferred to frame 248 of support 246. To do so, power-turbine section 188 and exhaust collector 190 may be slid on guide tracks 204, 205 until engine support 120 is aligned with support structures 252, 256 in substantially the same manner that engine support 120 aligns with support structures 124, 126 when mounted thereto. Subsequently, power-turbine section 188 and exhaust collector 190 may be secured to frame 248 by using the process described above to transfer the weight of engine support 120, power-turbine section 188, and exhaust collector 190 to support structures 252, 256 and secure engine support 120 to support structures 252, 256.

Before moving power-turbine section 188 and exhaust collector 190 on guide tracks 204, 205 independently of gas producer 184 and combustor 186, it may be necessary to provide additional support for and/or move gas producer 184 and combustor 186. Additional support may be provided for combustor 186 by engaging moveable support 164 between guide tracks 114 and combustor 186 in the manner discussed above in connection with FIGS. 8A-8C. Additionally, moveable support 162 may be engaged between guide tracks 112 and compressor 187 in the manner discussed above in connection with FIGS. 8A-8C. Subsequently, as described in detail above, compressor 187, combustor 186, and moveable supports 162, 164 may be moved as a unit on guide tracks 112, 114 away from power-turbine section 188 and exhaust collector 190.

The ability to support and move gas turbine engines 82, 182 and portions thereof in the above-discussed manners may facilitate maintenance of power systems 80, 180 in a number of ways, thereby helping keep power systems 80, 180 available to do work a high percentage of the time. Longitudinally separating sections of gas turbine engines 82, 182 may provide access to internal components for repair. In some cases, longitudinally separating sections of gas turbine engines 82, 182 may also eliminate longitudinal overlap between components of the separated sections so that one or more of the sections may be moved away from longitudinal axes 92, 192 independently of other sections. In circumstances where a gas turbine engine 82, 182 has been separated longitudinally, one or more sections of that gas turbine engine 82, 182 may be moved away from the associated longitudinal axis 92, 192 to improve the access to internal components. Alternatively, one or more sections of a gas turbine engine 82, 182 may be moved away from the associated longitudinal axis 92, 192 independently of other sections to provide access to internal components, without longitudinally separating the gas turbine engine 82, 182.

Additionally, moving a gas producer 84, 184 and combustor 86, 186 away from the associated power-turbine section 88, 188 without moving the associated intake ducting 85, 185 may provide certain advantages related to maintenance and repair. For example, this may provide increased access to internal components of the gas turbine engine 82, 182 without releasing the engagements between the intake ducting 85, 185 and the external intake ducting connected thereto. This may save considerable time and effort in maintaining and repairing the gas turbine engine 82, 182.

Additionally, the ability to move one or more sections of a gas turbine engine 82, 182 away from the associated longitudinal axis 92, 192 independently of other sections may allow quickly and easily replacing one or more sections of the gas turbine engine 82, 182 without replacing other sections. For example, power-turbine section 88 and exhaust collector 90 of gas turbine engine 82 may be replaced without replacing gas producer 84 and combustor 86. To do so, support 30, power-turbine section 88, and exhaust collector 90 may first be slid off of base/support 16 onto portable supports 50, 52, while support 32, gas producer 84, and combustor 86 are left on base/support 16. Subsequently, support 30, power-turbine section 88, and exhaust collector 90 may be removed from portable supports 50, 52, and a replacement support, power-turbine section, and exhaust collector may be loaded onto portable supports 50, 52 and slid into place on base/support 16.

Similarly, gas producer 184 and combustor 186 of gas turbine engine 182 may be replaced without replacing power-turbine section 188 and exhaust collector 190. To do so, gas producer 184 and combustor 186 may be suspended from guide tracks 205, 208, 210 using moveable supports 164, 271 and then slid from base/support 116 to support 246 on guide tracks 205, 208, 210. Subsequently, gas producer 184 and combustor 186 may be removed from moveable supports 164, 271, after which a new gas producer and combustor may be mounted to moveable supports 164, 271 and slid into place on base/support 116.

Additionally, the disclosed embodiments allow quickly and easily replacing a gas turbine engine 82, 182 as a unit. To replace gas turbine engine 82 as a unit, frame 28 and gas turbine engine 82 may first be slid off of base/support 16 onto portable supports 50, 52, 54 and then removed from portable supports 50, 52, 54. Subsequently, a replacement frame and gas turbine engine may be loaded onto portable supports 50, 52, 54 and slid into place on base/support 16. To replace gas turbine engine 182 as a unit, gas turbine engine 182 may be suspended from guide tracks 204, 205, 210 using moveable supports 271, 273 and then slid from base/support 116 to support 246 on guide tracks 204, 205, 210. Subsequently, gas turbine engine 182 may be removed from moveable supports 271, 273, and a new gas turbine engine may be attached to moveable supports 271, 273 and slid into place on base/support 116.

After a gas turbine engine 82, 182 or a section thereof is removed from base/support 16, it may be transported to a convenient service facility for repair. During transport and repair of gas turbine engine 82 or a section thereof, frame 28 or a support 30, 32 thereof may serve as a transport frame. When frame 28 and gas turbine engine 82 are separated from base/support 16, frame 28 may serve as a transport frame fully supporting gas turbine engine 82 during various operations. Similarly, frame 248 of support system 110 may serve as a transport frame for gas turbine engine 182, fully supporting gas turbine engine 182. For example, frames 28, 248 may fully support gas turbine engines 82, 182 during operations such as loading gas turbine engines 82, 182 onto vehicles, transporting gas turbine engines 82, 182 with those vehicles, unloading gas turbine engines 82, 182 from those vehicles, and repairing gas turbine engines 82, 182. Similarly, frame 248 may serve as a transport frame for gas producer 184 and combustor 186 when they have been separated from power-turbine section 188 and secured to frame 248. Likewise, when support 30, power-turbine section 88, and exhaust collector 90 are separated from base/support 16, gas producer 84, and combustor 86, support 30 may serve as a transport frame fully supporting power-turbine section 88 and exhaust collector 90 during transport and repair.

Furthermore, as discussed above, in some embodiments, a support system 10, 110 may include transport wheels (not shown) and hitch structure (not shown) for its frame 28, 248. In such embodiments, the frame 28, 248, the transport wheels, and the hitch structure may collectively serve as a transport trailer for the gas turbine engine 82, 182 or a portion thereof.

Use of support systems 10, 110 is not limited to the examples discussed above and shown in the figures. For example, in some cases, support 30, power-turbine section 88, and exhaust collector 90 of gas turbine engine 82 may be held stationary on base/support 16 while support 32 is moved on guide tracks 44, 46 to move gas producer 84 and combustor 86 away from longitudinal axis 92. Additionally, a gas turbine engine 82, 182 may be separated at points other than between its combustor 86, 186 and its power-turbine section 88, 188. For example, a gas turbine engine 82, 182 may be separated between its gas producer 84, 184 and its combustor 86, 186. Furthermore, a gas turbine engine 82, 182 and/or sections thereof may be moved for reasons other than those discussed above. Moreover, various portions of a support system 10, 110 may be used to support different portions of gas turbine engine 82, 182 than discussed above, and various portions of a gas turbine engine 82, 182 may be moved in different manners than discussed above while supported by the associated support system 10, 110.

In addition to providing the advantages discussed above, by utilizing guide tracks 42, 44, 46, 68, 74, 112, 114, 204, 205, 208, 210 to limit movement of supports 30, 32, 62, 64, 162, 164, 271, 273 to predetermined paths, the disclosed embodiments allow precisely controlling the movement of gas turbine engines 82, 182 and sections thereof. This may help prevent collisions when maneuvering gas turbine engine 82, 182 and/or components thereof. It may also facilitate achieving proper alignment between components when assembling them to one another. These benefits may be particularly significant under harsh conditions, such as in adverse weather in a marine environment.

It will be apparent to those skilled in the art that various modifications and variations can be made in the power system and methods without departing from the scope of the disclosure. Other embodiments of the disclosed power system and methods will be apparent to those skilled in the art from consideration of the specification and practice of the power system and methods disclosed herein. It is intended that the specification and examples be considered as exemplary only, with a true scope of the disclosure being indicated by the following claims and their equivalents.

What is claimed is:

1. A method of supporting a gear box of a gas turbine engine, the method comprising:
   disconnecting a pipe from a pipe connection on the gear box;
   fastening a first moveable support to the pipe connection;
   moving the gear box while supporting the gear box at least partially by the pipe connection with the first moveable support.

2. The method of claim 1, wherein supporting the gearbox at least partially by the pipe connection with the first moveable support includes guiding the first moveable support with a guide track.

3. The method of claim 2, wherein:
   the guide track is mounted on a base; and
   the base supports the gas turbine engine.

4. The method of claim 1, wherein the gearbox is mounted on a forward end portion of a compressor of the gas turbine engine.

5. The method of claim 4, further including disconnecting the gear box from other portions of the compressor, and wherein moving the gear box includes moving the gearbox separate from the other portions of the compressor.

6. The method of claim 4, wherein moving the gear box includes moving the gear box along with the rest of the compressor.

7. The method of claim 6, wherein:
   the gas turbine engine further includes intake ducting with a central passage; and
   the moving of the gear box along with the rest of the compressor includes moving the compressor at least partially through the central passage of the intake ducting of the compressor.

8. The method of claim 6, wherein the moving of the gear box along with the rest of the compressor further includes supporting the compressor at least partially with a second moveable support.

9. The method of claim 8, wherein supporting the compressor at least partially with the first moveable support and the second moveable support includes guiding each of the first moveable support and the second moveable support with a guide track.

10. The method of claim 1, wherein fastening the first moveable support to the pipe connection includes attaching a flange of the first support to the pipe connection.

11. The method of claim 1, wherein fastening the first moveable support to the pipe connection includes attaching the first moveable support to a flange of the pipe connection.

12. The method of claim 11, wherein fastening the first moveable support to the pipe connection includes bolting the first moveable support to the flange.

13. The method of claim 1, wherein fastening the first moveable support to the pipe connection includes attaching a first flange of the first support to a second flange of the pipe connection.

14. The method of claim 1, wherein fastening the first moveable support to the pipe connection includes attaching the first moveable support to a radially extending annular flange of the pipe connection.

* * * * *